(12) United States Patent
Cui et al.

(10) Patent No.: US 11,102,776 B2
(45) Date of Patent: Aug. 24, 2021

(54) APPARATUSES FOR SELECTING COMMUNICATION BEAMS BASED ON NORMALIZED TIME OF ARRIVAL (TOA) OF REFERENCE SIGNALS

(71) Applicant: APPLE INC., Cupertino, CA (US)

(72) Inventors: Jie Cui, Santa Clara, CA (US); Yang Tang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 139 days.

(21) Appl. No.: 16/163,379

(22) Filed: Oct. 17, 2018

(65) Prior Publication Data

US 2019/0053234 A1 Feb. 14, 2019

Related U.S. Application Data

(60) Provisional application No. 62/574,313, filed on Oct. 19, 2017.

(51) Int. Cl.
| | |
|---|---|
| *H04W 72/08* | (2009.01) |
| *H04W 72/04* | (2009.01) |
| *H04W 56/00* | (2009.01) |
| *H04L 5/00* | (2006.01) |

(52) U.S. Cl.
CPC ......... *H04W 72/0446* (2013.01); *H04L 5/005* (2013.01); *H04W 56/001* (2013.01); *H04W 72/046* (2013.01); *H04W 72/085* (2013.01)

(58) Field of Classification Search
CPC combination set(s) only.
See application file for complete search history.

(56) References Cited

U.S. PATENT DOCUMENTS

| | | | |
|---|---|---|---|
| 9,559,417 B1 * | 1/2017 | Schwarzwalder ... | H04B 7/0617 |
| 2016/0295366 A1 * | 10/2016 | Priyanto ............ | H04B 7/0413 |
| 2018/0070209 A1 * | 3/2018 | Jain ............... | G01S 5/10 |
| 2018/0220406 A1 * | 8/2018 | Mizusawa .......... | H04B 7/04 |
| 2018/0331747 A1 * | 11/2018 | Kakishima .......... | H04B 7/0639 |
| 2019/0116605 A1 * | 4/2019 | Luo .............. | H04B 7/0695 |
| 2019/0223140 A1 * | 7/2019 | Grossmann ......... | G01S 5/14 |
| 2019/0245595 A1 * | 8/2019 | Xu ................ | H04B 7/063 |
| 2020/0280820 A1 * | 9/2020 | Zhang ............. | G01S 5/0205 |

FOREIGN PATENT DOCUMENTS

WO  WO-2017038368 A1 * 3/2017 ........... H04B 7/0621

* cited by examiner

*Primary Examiner* — Yee F Lam
(74) *Attorney, Agent, or Firm* — Stoel Rives LLP

(57) ABSTRACT

Apparatuses for selecting communication beams based on normalized times of arrival (ToA) of reference signals (RSs) are disclosed. An apparatus of a first cellular communication device includes a data storage device configured to store reference signal data identifying a plurality of reference signals corresponding to a plurality of communication beams used by a second cellular communication device. The apparatus also includes one or more processors configured to process a received portion of the plurality of reference signals received from the second cellular communication device through at least a portion of the plurality of communication beams, normalize ToAs of one or more reference signals of the received portion of the plurality of reference signals to a time period unit; and identify which of the plurality of communication beams correspond to the one or more reference signals using the reference signal data.

20 Claims, 11 Drawing Sheets

APPARATUSES FOR SELECTING COMMUNICATION BEAMS BASED ON NORMALIZED TIME OF ARRIVAL (TOA) OF REFERENCE SIGNALS

RELATED APPLICATIONS

This application claims priority to U.S. Provisional Patent Application No. 62/574,313, filed Oct. 19, 2017, the entire disclosure of which is hereby incorporated herein by reference.

BACKGROUND

Various embodiments generally may relate to the field of wireless communications, and more particularly, to using Time of Arrival (ToA) based positioning in new radio (NR).

DETAILED DESCRIPTION OF PREFERRED EMBODIMENTS

Figure 1:
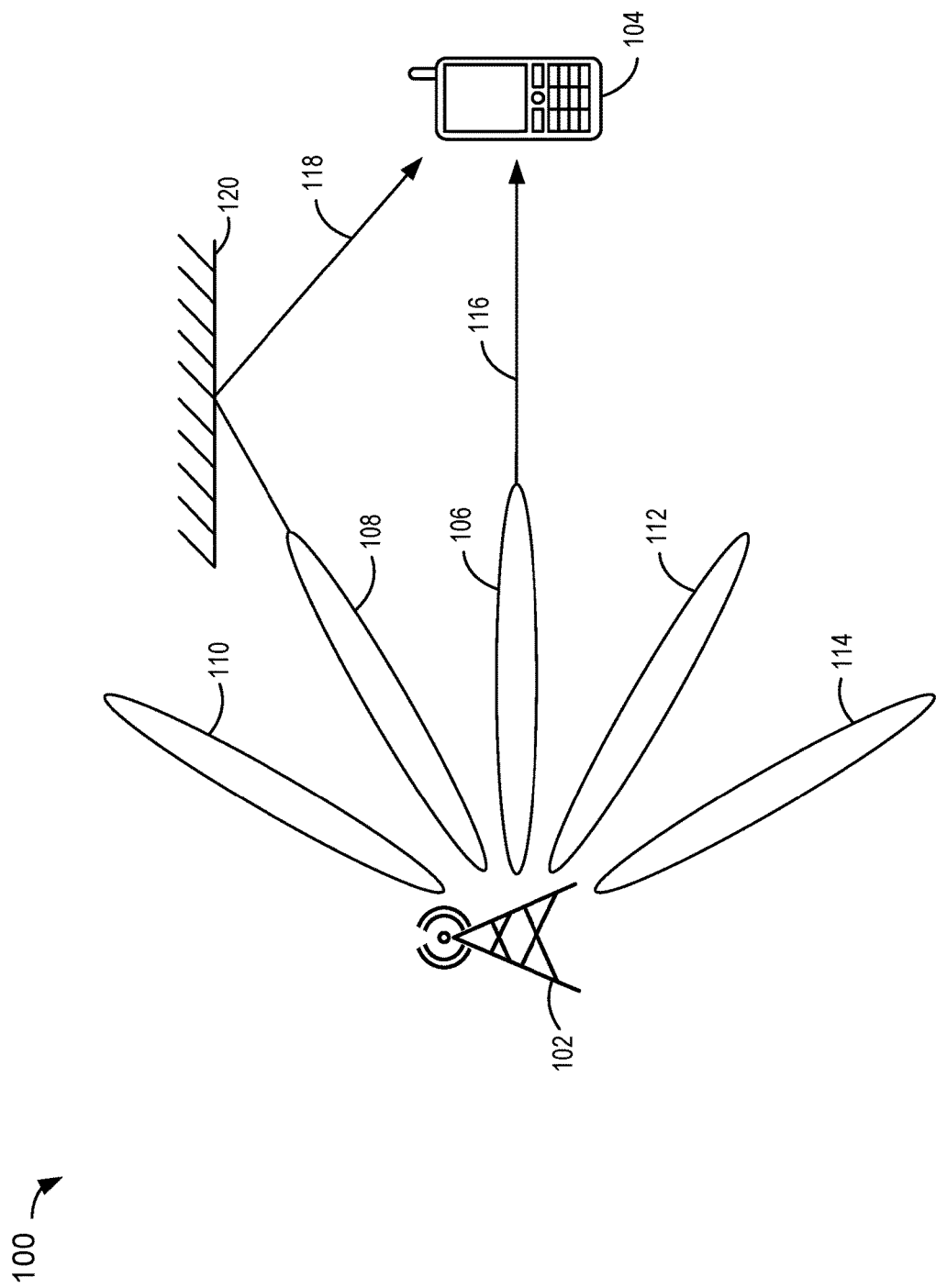
FIG. 1 is a simplified illustration of a wireless communication system, according to some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

In new radio (NR) systems, also known as Fifth Generation (5G) systems, including those using millimeter wave (mmWave) communications, multiple communication beams will be used for transmission and reception at both the next generation NodeB (gNB) side and the user equipment (UE) side. It is contemplated that any system consistent with embodiments herein may use five, eight, or any other number of communication beams. In some embodiments consistent with the present disclosure, a gNB may be a cellular base station in a cellular communications network. Also, embodiments of the disclosure extend to any communication systems where multiple beams are used for transmission, reception, or both transmission and reception. As a result, any reference to a particular communication node as a UE or gNB herein may be substituted with a more generic "communication device" to extend the disclosure to these systems. Furthermore, as the term "gNB" applies specifically to a radio access network (RAN) node serving as a cellular base station in NR or 5G systems, the term "cellular base station" could be used herein to replace the term "gNB" to appropriately extend the embodiments of the disclosure to other cellular systems such as Long Term Evolution (LTE) systems, Third Generation (3G) systems, Second Generation (2G) systems, and cellular communication systems that have not yet been contemplated (but that incorporate embodiments of the disclosure).

A time of arrival (ToA) based solution may be used as a positioning method in some wireless systems using multiple communication beams. In these systems, characteristics regarding the physical channel between the gNB and a UE or other device (including, but not limited to, distance, relative location, signal path of travel, and/or nature of interference sources) may be known or estimated based upon the traversal time of a reference signal (RS) from a gNB (or other device) to the UE (or other device), or based upon the traversal time of a signal from a UE (or other device) to a gNB (or other device).

The terms "beam" and "communication beam" are used interchangeably herein. A beam may include a Tx beam at a gNB for downlink, an Rx beam at a UE for downlink, a Tx beam at UE for uplink, or an Rx beam at a gNB for uplink.

NR scenarios involving multiple communication beams may take into account particular considerations for ToA based positioning. Specific RSs are associated with specific communication beams to enable differentiation between the different communication beams. In these scenarios, multiple RSs may be received at a device through different beams during a relevant time period. Timing information for these beams may be determined by normalizing ToAs for these beams. The receiving device may compare and/or report timing information for all or for fewer than all RSs (e.g., only one RS) received during that time period. In some embodiments, a UE may report, to a gNB, timing information for one or more RSs that arrived at the UE with earlier normalized ToAs than other RSs. By way of non-limiting example, the UE may report timing information for only the RS that has the earliest normalized ToA. In some embodiments, a UE may report timing information for one or more RSs received at the UE that did not necessarily have the earliest normalized ToAs, but had the best associated signal qualities of the received RSs. By way of non-limiting example, the UE may report timing information for only the RS that has the best signal quality of the received RSs. In some embodiments, a device will be configured to consider both timing information and signal quality of the received RSs when selecting one or more of the RSs for which to report timing information or selecting one or more beams for use in communication.

An RS in embodiments disclosed herein may be, but is not limited to, a Synchronization Signal Block (SSB), a Positioning Reference Signal (PRS), a Channel State Information Reference Signal (CSI-RS), a DeModulation Reference Signal for a Physical Broadcast Channel (DMRS for PBCH), a Primary Synchronization Signal (PSS), a Secondary Synchronization Signal (SSS), a Physical Random Access Channel (PRACH) signal, a Physical Uplink Control Channel (PUCCH) signal, or a Sounding Reference Signal (SRS). It is further contemplated that other signals or signal types may be used as an RS. By way of non-limiting example, a new signal or signal type may be created and designated for use as an RS.

FIG. 1 is a simplified illustration of a wireless communication system 100, according to some embodiments. The wireless communication system 100 includes a gNB 102 and a UE 104 in wireless communication (e.g., via a cellular data communication link). The gNB 102 broadcasts multiple transmit ("Tx") beams 106-114. The UE 104 can receive one or more reference signals on the different Tx beams 106-114. Each beam 106-114 from the gNB 102 may be associated with a specific RS index, so the UE 104 may understand each beam as associated with a different index for an RS. For example, the first beam 106 may be associated with a first reference signal index, the second beam 108 may be associated with a second reference signal index, the third beam 110 may be associated with a third reference signal index, the fourth beam 112 may be associated with a fourth reference signal index, and the fifth beam 114 may be associated with a fifth beam index. The UE 104 may store information identifying the RSs in one or more data storage devices of the UE 104 to enable the UE to identify the RSs.

In FIG. 1, the first beam 106 travels from the gNB 102 to the UE 104 along a first path 116. The second beam 108 travels from the gNB 102 to the UE 104 along a second path 118. The second path 118 includes a reflection by an obstacle 120, which obstructs the second path 118. Different RSs may be sent by the gNB 102 in the first beam 106 and the second beam 108 along the first path 116 and the second path 118, respectively.

Under these conditions, it may be that of the sent RSs, the highest quality (e.g., strongest RS received at UE 104 may be the RS travelling along the first path 116 associated with the first beam 106. The received RS associated with the second beam 108 may have a lower received power than that of the RS associated with the first beam 106 because the second beam 108 is reflected by the obstacle 120, which could cause an RS signal travelling along the second path 118 to lose power before reaching the UE 104. Another reason the received RS associated with the second beam 108 may have a lower received power than the received RS associated with the first beam 106 may be because the second path 118 is longer than the first path 116. As a result, the RS traveling along the second path 118 suffers a greater propagation loss relative to an RS traveling along the first path 116.

The first RS to arrive at the UE 104 may be the RS received through the first path 116, which may be a straight line assuming a line of sight connection between the gNB 102 and the UE 104. As a result, the first path 116 is shorter than the second path 118, and the RS associated with the first beam 106 would have an earlier normalized ToA than that of an RS associated with the second beam 108. In embodiments where the UE 102 has been configured to report timing information of the RS signal having the earliest normalized ToA, the UE 102 may report timing information of the RS signal that arrived through the first path 116.

Figure 2:
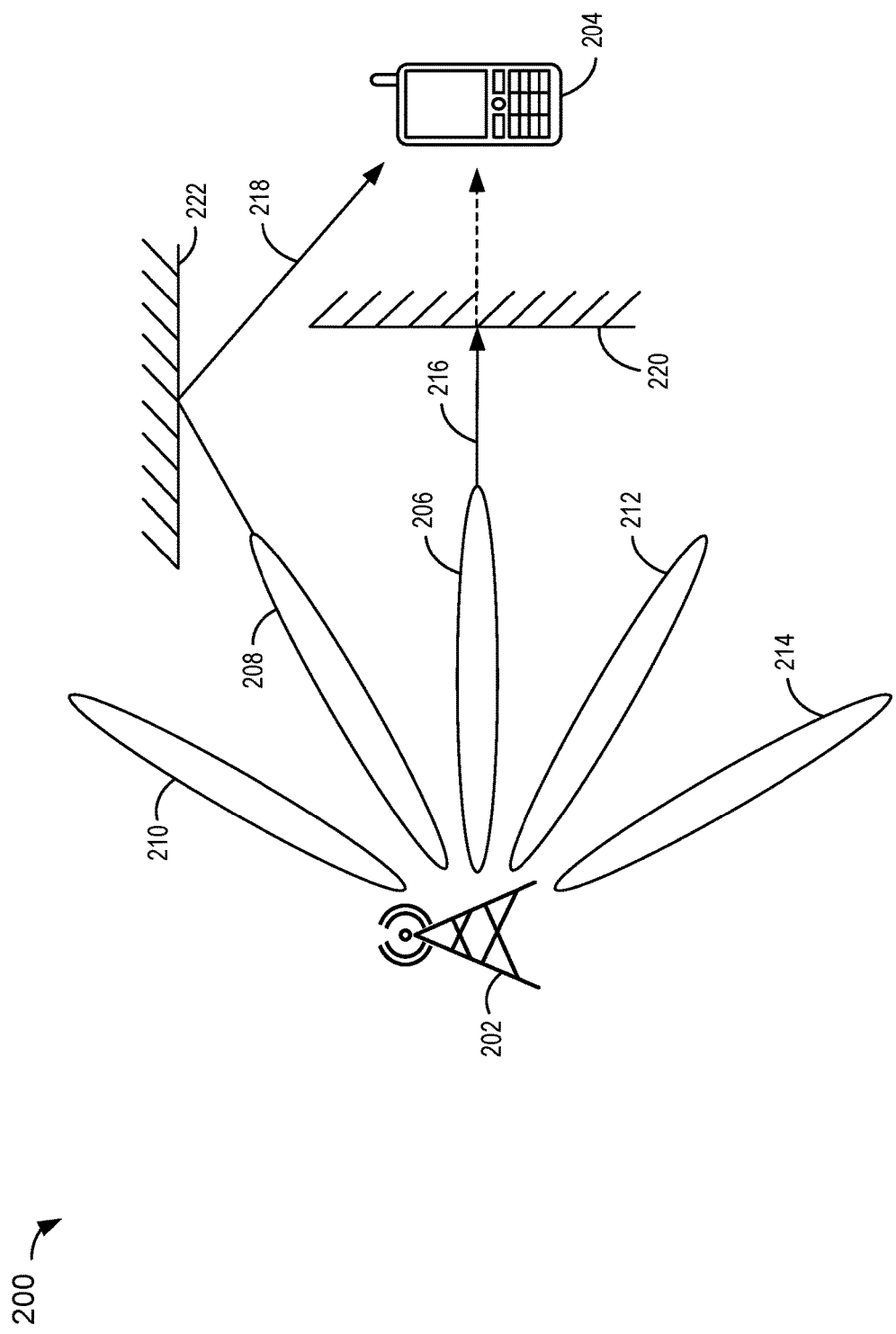
FIG. 2 is a simplified illustration of a wireless communication system, according to some embodiments.

FIG. 2 is a simplified illustration of a wireless communication system 200, according to some embodiments. The wireless communication system 200 includes a gNB 202 and a UE 204 in wireless communication, similar to the gNB 102 and the UE 104 of FIG. 1. Similar to the wireless communication system 100 of FIG. 1, the gNB 202 broadcasts multiple Tx beams 206-214. The UE 204 can receive one or more reference signals on the different Tx beams 206-214. As described above in relation to FIG. 1, each beam from the gNB 202 may be associated with a specific RS index, so the UE 204 may understand each beam as associated with a different index for an RS.

FIG. 2 illustrates a case where a highest quality (e.g., strongest) RS received at the UE 204 may not be the same as an RS having an earliest normalized ToA at the UE 204. In FIG. 2, the first beam 206 travels from the gNB 202 to the UE 204 along a first path 216. The second beam 208 travels from the gNB 202 to the UE 204 along a second path 218. The first path 216 passes through a first obstacle 220 on its way to the UE 204. The second beam 208 is reflected by an obstacle 222, which is located along the second path 218 to the UE 204. An RS may be sent by the gNB 204 along each of the first path 216 and the second path 218. The RS traveling along the first path 216 may suffer a large penetration loss when passing through the first obstacle 220 in order to arrive at the UE 204. Therefore, the RS traveling along the first path 216 might not be the highest quality RS received at the UE in terms of RSRP, RSRQ, SINR, or another measure of signal quality. The RS traveling along the second path 218 might instead be the highest quality received RS in terms of RSRP, RSRQ, SINR, or another measure of signal quality. This may be because the loss from reflection of the second RS signal traveling along the second path 218 as reflected by the obstacle 222 is less than the penetration loss associated with the first RS signal traveling along the first path 216. However, the second RS may not have the earliest normalized ToA when it arrives at the UE 204. This may be because the first RS traveling along the first path 216 takes a shorter path to reach the UE 202 than that of the second RS, and thus this first RS has an earlier normalized ToA. In this scenario, if the UE 204 has been configured to report timing information of the RS signal having the earliest normalized ToA, the UE 202 may report, to the network, timing information (e.g., estimated timing information) for the first RS traveling along the first path 216, even though it was not the highest quality RS signal that was received. In some embodiments, if the UE 202 has been configured to report timing information on the highest quality RS signal to arrive, the UE 202 may instead report, to the network, timing information for the second RS traveling along the second path.

Figure 3:
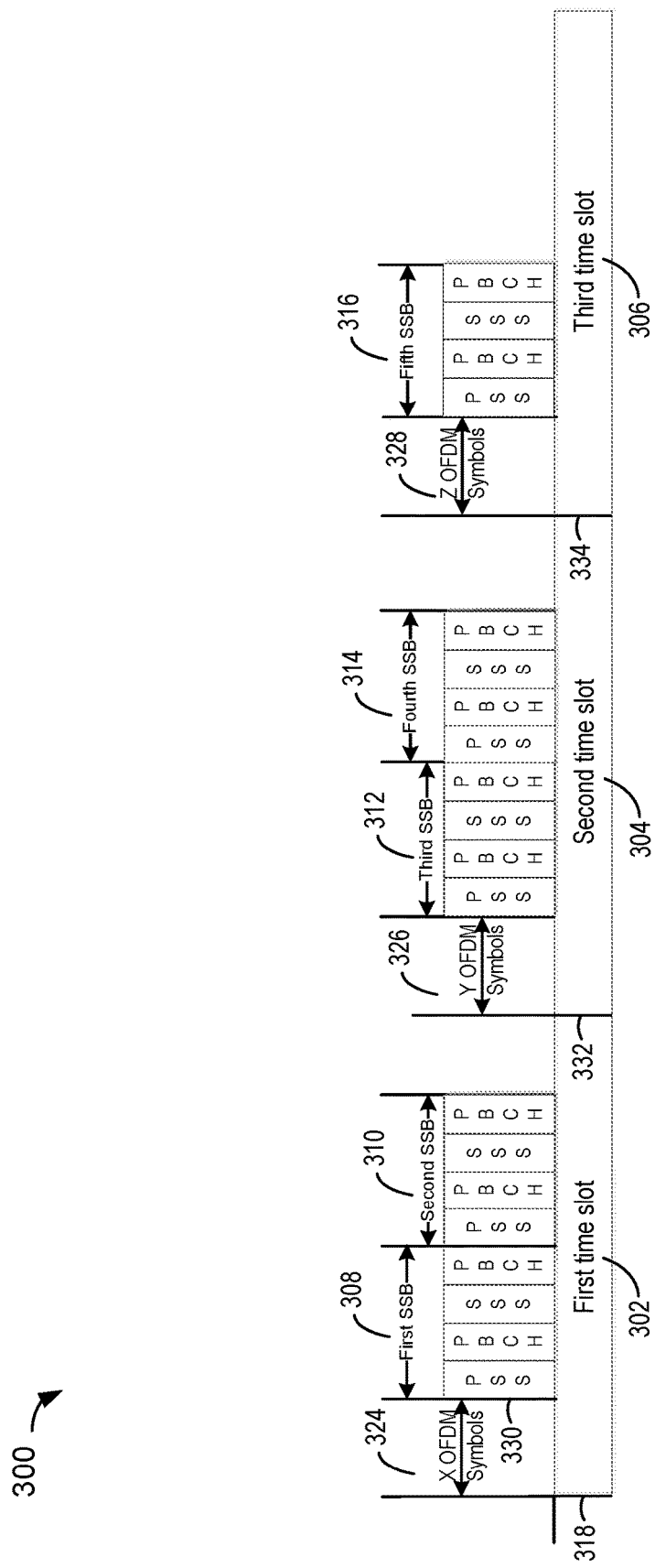
FIG. 3 is a simplified timing diagram illustrating an example of timing of transmitted RSs, according to some embodiments.

FIG. 3 is a simplified timing diagram 300 illustrating an example of timing of transmitted RSs, according to some embodiments. This timing of the transmitted RSs may be known by a receiving device (e.g., the timing is predetermined or indicated by the transmitting device to the receiving device in a timing message). As the timing is known by the receiving device, the receiving device can use the timing information to normalize the time of arrival of each of the RSs to a common time reference. This allows the receiving device to determine which of the RSs arrived the fastest from transmission to reception, corresponding to an earliest normalized ToA.

In the example of FIG. 3, multiple RSs including multiple SSBs 308-316 are transmitted across multiple time slots 302-306. Each of the SSBs 308-316 are illustrated here with four OFDM symbols per SSB. An RS according to some embodiments may instead include two, seven, or any other number of OFDM signals. The embodiment of FIG. 1 may be used as an example to illustrate the example of FIG. 3. Referring to FIGS. 1 and 3 together, the UE 104 is receiving the SSBs 308-316 from the gNB 102. The gNB 102 has five (or more) Tx beams 106-114 for the downlink. Each of the SSBs 308-316 corresponds to one of the Tx beams 106-114. The SSBs 308-316 may each correspond to a different RS index reflecting the corresponding Tx beam 106-114 through which it arrived at the UE 104.

In some embodiments, the SSBs 308-316 are transmitted by the gNB 102 at different time occasions in the time domain. In the example of FIG. 3, each SSB 308-316 occupies four Orthogonal Frequency Division Multiplexing (OFDM) symbols (i.e., each SSB time occasion is equivalent to 4 OFDM symbols). As illustrated in FIG. 3, the gNB 102 may transmit at least five SSBs 308-316 on at least five different beams 106-114 (with the first SSB 308, the second SSB 310, the third SSB 312, the fourth SSB 314, and the fifth SSB 316 each transmitting through a different beam 106-114). The ToA of each SSB 308-316 may be derived from, for example, an estimated first arrival path timing of the SSB 308-316 at the UE 104. As illustrated in FIG. 3, the SSBs 308-316 are each transmitted at a different time occasion in the time domain, as can be seen with reference to the differing placements of each respective SSB 308-316 across time slots 302-306. The UE 104 may be able to receive the five SSBs 308-316 through the five different beams 106-114. The UE 104 may record measured or estimated ToAs of the SSBs 308-316 (these ToAs may be referred to herein equivalently as "measured ToAs," "estimated ToAs," or "recorded ToAs"). The UE 104 may also be able to use its knowledge of the timing illustrated in FIG. 3 to normalize the ToAs of the SSBs 308-316 to a common time period (e.g., a common time period unit).

The ToAs of SSBs 308-316 may be normalized to a common time period unit in order to facilitate comparison of the total time that it took for each SSB 308-316 to travel from the gNB 102 to the UE 104 (i.e., the normalized ToA). In general terms, a time period unit used for normalization with systems or methods described herein may include a time slot, an OFDM symbol, a subframe, a system frame, or any other period of time that the system or method is capable of measuring.

In the embodiment of FIG. 3, the selected time period unit is a time slot. As illustrated in FIG. 3, The first SSB 308 and the second SSB 310 are transmitted by the gNB 102 in the first time slot 302, the third SSB 312 and the fourth SSB 314 are transmitted by the gNB 102 in the second time slot 304, and the fifth SSB 316 is transmitted by the gNB in the third time slot 306. Under these circumstances, the ToAs of the first SSB 308 and the second SSB 310 are normalized to the first time slot 302, which is the time at a head 318 of the first time slot 302. By way of non-limiting example, each of SSB 308-316 may include a PSS, a PBCH, an SSS and a PBCH.

To normalize the ToAs of the SSBs 308-316, the UE 104 uses timing information that is known regarding how the gNB 102 transmits the SSBs 308-316. For example, the UE 104 may store RS timing information received from the gNB 102. This timing information may indicate points of reference for timing of the RSs relative to each other and relative to time slots. By way of non-limiting example, the RS timing information may indicate timing of the time slots 302-306 relative to the SSBs 308-316 and to each other, timing of the SSBs 308-316 relative to the time slots 302-316 and to each other, or combinations thereof. As a result, to the extent that the SSBs 308-316 are received according to a different timing than that set forth in the timing information, the UE 104 can attribute this variation in timing of the SSBs 308-316 to the channel between the UE 104 and the gNB 102. The UE 104 can use the timing information to normalize the received SSBs 308-316 to a common time unit. In consequence, the UE 104 can determine which of the SSBs 308-316 had an earliest normalized ToA, which would correspond to a shortest total time of propagation between the gNB 102 and the UE 104.

As a specific, non-limiting example, the UE 104 may use a head 318 of the first time slot 302 as a point of reference to normalize the first SSB 308 and the second SSB 310. In this example, the normalization of the first SSB 308 to the first time slot 302 is calculated by determining (e.g., based on timing information provided by the gNB, as shown in FIG. 3) that there is a number X of OFDM symbols 324 (where X≥0) between the head 318 of the first time slot 302 to a head 330 of the first SSB 308. An estimated ToA of the first time slot 302 may then be determined from the estimated ToA of the first SSB 308 (corresponding to the head 330 of the first SSB 308) by subtracting the amount of time corresponding to x OFDM symbols (i.e., X OFDM symbol durations) from the ToA of SSB 308. The normalized ToA of the first SSB 308 may then be computed as follows:

(Normalized ToA of the first SSB 308)=(estimated ToA of the first SSB 308)−$X$*(duration of a single OFDM symbol), where "−" is the subtraction operator and "*" is the multiplication operator.

The normalized ToA of the second SSB 310 may be derived in similar fashion. For example, if it is known that the first SSB 308 includes four OFDM symbols and the second SSB 310 is transmitted immediately following transmission of the first SSB 308 (as shown in FIG. 3), the ToA of the second SSB 310 may be normalized by simply accounting for the four extra OFDM symbols introduced by the first SSB 308 prior to the arrival of the second SSB 310, as shown below:

(Normalized ToA of the second SSB 310)=(estimated ToA of the second SSB 310)−$(X+4)$*(duration of a single OFDM symbol), where "+" is the addition operator.

The third SSB 312 and the fourth SSB 314 were transmitted in the second time slot 304 rather than in the first time slot 302, as illustrated in FIG. 3. The transmission of the third SSB 312 was preceded by a number Y of OFDM symbols 326 (where Y≥0) following a head 332 of the second time slot 304. To normalize the ToAs of these SSBs to the head 318 of the first time slot 302 such that they are comparable to the normalized ToAs of the first SSB 308 and the second SSB 310, the slot difference from the first time slot 302 to the second time slot 304 is considered as well as the amount of time corresponding to the collection of Y OFDM symbols 326:

(Normalized ToA of the third SSB 312)=(estimated ToA of the third SSB 312)−$Y$*(duration of a single OFDM symbol)−(duration of a single time slot).

The normalized ToA of the fourth SSB 314 may be derived in similar fashion, while simply accounting for the four extra OFDM symbols introduced by the third SSB 312 prior to the transmission of the fourth SSB 314. This calculation is as follows:

(Normalized ToA of the fourth SSB 314)=(estimated ToA of the fourth SSB 314)−(*Y*+4)*(duration of a single OFDM symbol)−(duration of a single time slot).

As illustrated in FIG. 3, the fifth SSB 316 was transmitted in the third time slot 306 rather than in the first time slot 302 or the second time slot 304. The transmittal of the fifth SSB 316 was preceded by a number Z of OFDM symbols 328 (where Z≥0) following a head 334 of the third time slot 306. To normalize the fifth SSB 316 to the head 318 of the first time slot 302 such that it is comparable to the normalized ToAs of the first, second, third and fourth SSBs 308-314, the time difference from the first time slot 302 to the third time slot 306 is considered as well as the amount of time corresponding to the Z OFDM symbols 328. This calculation is as follows:

(Normalized ToA of the fifth SSB 316)=(estimated ToA of the fifth SSB 316)−Z*(duration of a single OFDM symbol)−2*(duration of a single slot).

At this juncture, all the ToAs of the SSBs 308-316 have been normalized to a same reference slot timing and it is possible to compare these normalized ToA values in order to determine which of the SSBs 308-316 has the earliest normalized ToA.

Figure 4:
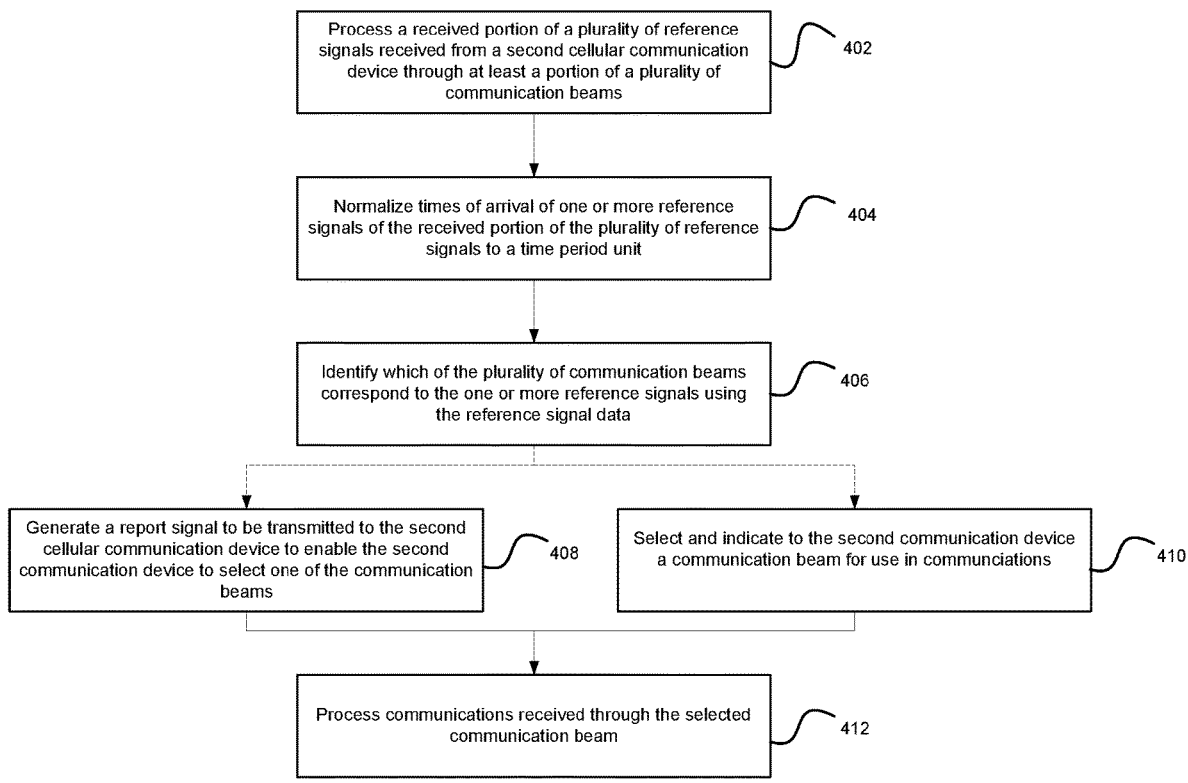
FIG. 4 is a simplified flowchart illustrating a method of operating a wireless communication system, according to some embodiments.

FIG. 4 is a simplified flowchart illustrating a method 400 of operating a wireless communication system, according to some embodiments. The method 400 may be used to communicate data from a first cellular communication device to a second communication device. The method 400 may be used to communicate timing information for one or more reference signals received at the first cellular communication device to the second cellular communication device. The first cellular communication device may include a data storage device which contains stored reference signal data identifying a plurality of reference signals corresponding to a plurality of communication beams used by the second cellular communication device.

The method 400 includes processing 402 a received portion of a plurality of reference signals transmitted by a second cellular communication device through at least a portion of a plurality of communication beams. It should be noted that, in some instances, not all of the communication beams used by the second communication device may reach the first communication device. For example, one or more of the communication beams may be obstructed, point in a direction that is away from the first communication device, or otherwise fail to reach the first communication device. As a result, the received portion of the plurality of references signals may include all of the reference signals corresponding to all the communication beams, only a portion of the reference signals, only one of the reference signals, or in some instances none of the reference signals.

The method 400 also includes normalizing 404 times of arrival of one or more reference signals of the received portion of the plurality of reference signals to a common time period unit. The normalizing 404 may include performing calculations similar to the normalization calculations discussed above. In some embodiments, the normalizing 404 may be performed on each reference signal of the received portion of the plurality of reference signals. In some embodiments, the normalizing 404 may be performed on fewer than all (or even a single) of the reference signals of the received portion of the plurality of reference signals. In some embodiments, the reference signals of the received portion of the plurality of reference signals that are selected for normalization may have been previously indicated (e.g., by the second communication device) to the first communication device. In some embodiments, the reference signals of the received portion of the plurality of reference signals that are selected for normalization may be selected based on other characteristics. For example, these other characteristics may include signal quality measurements such as RSRP, RSRQ, SINR, other measures of signal quality, or combinations thereof.

The method 400 further includes identifying 406 which of the plurality of communication beams correspond to the one or more reference signals using the reference signal data.

In some embodiments, the second communication device (e.g., a gNB), which is the transmitter of the reference signals, may be configured to select one of the plurality of communication beams for use in transmitting communications to the first communication device (e.g., a UE). In such embodiments, the method 400 includes the first communication device generating 408 a report signal to be transmitted to the second cellular communication device. The report signal indicates timing information (e.g., normalized ToAs) of one or more of the received portion of reference signals to enable the second cellular communication device to select one of the communication beams for future communications. By way of specific, non-limiting example, the report signal may be generated by a UE in order to report the timing information (e.g., normalized ToAs) of one or more RSs associated with one or more specific beams and/or one or more specific RS indices. This timing information may include one or more normalized ToAs for the one or more reference signals. Also by way of specific, non-limiting example, the report signal may include an indication of an ordinal position of of one or more RSs, the RSs having been ordered based on their respective normalized ToAs (e.g., the RS that has the earliest normalized ToA corresponding to the shortest propagation time of the RS may be first in the order and the RS that has the latest normalized ToA corresponding to the longest propagation time of the RS may be last in the order).

In some embodiments, the report signal may include timing information regarding each of the one or more reference signals. In some embodiments, the report signal may include timing information regarding fewer than all (or even a single one) of the one or more reference signals. In some embodiments, the report signal may include timing information regarding the one or more reference signals which were previously indicated to the first communication device. In some embodiments, the report signal may include timing information for reference signals with other specified characteristics. These other specified characteristics may include signal quality measurements such as RSRP, RSRQ, SINR, other measures of signal quality, or combinations thereof.

In some embodiments, the first communication device (e.g., a gNB), which is the receiver of the reference signals, may be configured to select one of the plurality of communication beams for use by the second communication device (e.g., a UE) in transmitting communications to the first communication device. In such embodiments, the method 400 includes the first communication device selecting and indicating 410, to the second communication device, a communication beam of the plurality of communication beams to be used in subsequent communications.

The method 400 further includes the first communication device processing 412 communications received through the selected one of the plurality of communication beams.

In some embodiments, the first communication device includes a UE (e.g., the UE 104, 204 of FIGS. 1 and 2) and the second communication device includes a gNB (e.g., the gNB 102, 202 of FIGS. 1 and 2). In some such embodiments the UE may report the normalized timing information to the gNB to enable the gNB to select one of the communication beams to be used in subsequent communications (e.g., operation 408). In some such embodiments the gNB may select and indicate 410 the communication beam for use in subsequent communications.

In some embodiments, the first communication device includes a gNB (e.g., the gNB 102, 202 of FIGS. 1 and 2) and the second communication device includes a UE (e.g., the UE 104, 204 of FIGS. 1 and 2). In some such embodiments the gNB may select and indicate 410 the communication beam for use in subsequent communications. In some such embodiments, the gNB may report the normalized timing information to the UE to enable the UE to select one of the communication beams to be used in subsequent communications (e.g., operation 408).

Also, the method 400 of FIG. 4 is directed to selection of a transmit beam for use in subsequent communications. It will be apparent to one of ordinary skill that a similar method could be implemented to selection of a receive beam in addition to, or instead of, selection of a transmit beam. For example, rather than a list of normalized ToAs with an entry for each received RS that corresponds to a particular transmit beam, the normalized timing information may include a matrix of normalized ToAs of the RSs through the various combinations of the transmit beams and the receive beams. In this way, both a transmit beam and a receive beam may be selected.

Various embodiments implementing the method 400 of FIG. 4 are possible. Four specific non-limiting embodiments (Embodiments 1-4) for implementing the method of FIG. 4 are introduced below:

Embodiment 1

If multiple RSs for positioning are transmitted or received via multiple Tx and/or Rx beams, the ToA of the earliest arrived RS may be used for positioning timing (e.g., as a reference for normalizing the other received RSs) regardless of the used Tx or Rx beam. In other words, the ToA may be estimated from the first arrival path of a specific RS. An example of Embodiment 1 was provided above in the discussion of FIG. 3 in which the SSBs 308-316 were normalized based on an estimated ToA of the first SSB 308.

Embodiment 2

If multiple RSs for positioning are transmitted or received via multiple Tx and/or Rx beams, the network (e.g., a gNB) may indicate to a UE to estimate RS timing for a number N (where N is an integer) of RSs having the top/best signal quality (e.g., the top N strongest RSs with corresponding beams). By way of non-limiting example, the quality of an RS may be measured by the UE using RSRP, RSRQ, SINR, other measure of signal quality, or combinations thereof. The UE may estimate RS timings on these N beams (i.e., the corresponding RSs), and the UE may report, to the gNB, the timing information (e.g., the normalized ToAs) along with associated specific beam/RS index information of each of these RSs. In some instances, the UE may report the timing information (e.g., normalized ToA) and corresponding beam/RS index for only the RS with the earliest normalized ToA among these top N RSs/beams. The RS timing may be transmit timing or receive timing, and receive timing may be estimated from the first arrival path of a specific RS. Also, as previously discussed, the ToAs of RSs with different beams may be normalized to a same time period unit for comparison.

For example, a network (e.g., a gNB) may indicate to a UE to measure ToA of RSs on the top 8 (assuming that N=8) highest quality RSs/beams received at the UE. The UE will then measure the ToA of the top 8 highest quality (e.g., strongest) RSs with corresponding beams, and report the timing information (e.g., normalized ToA information) of these 8 RSs with their corresponding beams/RS indices. The UE may report the timing information (normalized ToA information and corresponding beam/RS index) for the RS with the earliest normalized ToA among these 8 highest quality RSs/beams.

Embodiment 3

If multiple RSs for positioning are transmitted or received via multiple Tx and/or Rx beams, a network (e.g., a gNB) may indicate to a UE to estimate timing of RSs whose RSRP/RSRQ/SINR are at or above a threshold. The UE may estimate RS timings on the RSs that exceed the given threshold, and the UE may report the timing information (e.g., normalized ToA information), along with associated specific beams/RS indices, of each of these RSs. In some instances, the UE may report the timing information (e.g., the normalized ToA information) and corresponding beam/RS index information for only the RS with the earliest normalized ToA among these RSs/beams that exceed the given threshold. The RS timing may be Tx timing or Rx timing, and Rx timing may be estimated from the first arrival path of a specific RS. As previously discussed, the ToAs of RSs with different beams may be normalized to a common time period unit for comparison.

For example, the network (e.g., the gNB) may indicate, to a UE, to measure ToA information of all received RSs with an RSRP, RSRQ or SINR greater than or equal to a signaled threshold. The UE will measure the ToA of RS above this threshold. The UE will then report the timing information (e.g., normalized ToA information) of these RSs along with their corresponding beams/RS indices. In some instances, the UE may report only the timing information (e.g., normalized ToA information) and corresponding beam/RS index information for only the RS with the earliest normalized ToA from among these RS that are above the threshold.

Embodiment 4

If multiple RSs for positioning are transmitted or received via multiple Tx and/or Rx beams, the network (e.g., the gNB) may indicate a bitmap of RSs/beams, indices of RSs/beams, or a pattern of RSs/beam to a UE to instruct the UE to measure the ToA information (e.g., the normalized ToA information) on those of the RSs/beams that are included in the bitmap/index/pattern. The UE may calculate RS timings (e.g., normalized ToAs) on these RSs/beams, and the UE may report the timing information (e.g., the normalized ToA information) and corresponding specific beam/RS indices information for each of these RSs. In some instances, the UE may report the timing information (e.g., the normalized ToA information) and the associated beam/RS index information only for the RS with the earliest normalized ToA among these RSs/beams. The RS timing may be Tx timing or Rx timing, and Rx timing may be estimated from the first arrival path of a specific RS. As previously discussed, the ToAs of RSs with different beams may be normalized to a same time period unit for comparison.

For example, in FIG. 3, the network may indicate a bitmap "11100" to a UE in a system with five communication beams. Each of the bits of the bitmap may correspond with a different one of the five communication beams. The bitmap may indicate to the UE that the UE should measure ToA information of the first, second, and third SSBs 308, 310, and 312 (i.e., corresponding to a first, second and third of the 5 communication beams). The UE will measure the ToAs of the first, second, and third SSBs 308, 310, and 312 on these communication beams, and then the UE will report the timing information (e.g., the normalized ToA information) of these SSBs 308, 310, and 312 along with their corresponding RS/beam index information. In some instances, the UE may report the timing information (e.g., the normalized ToA information) and the associated beam/RS index information only for the one of the SSBs 308, 310, and 312 with the earliest normalized ToA among the indicated RSs/beams.

Figure 5:
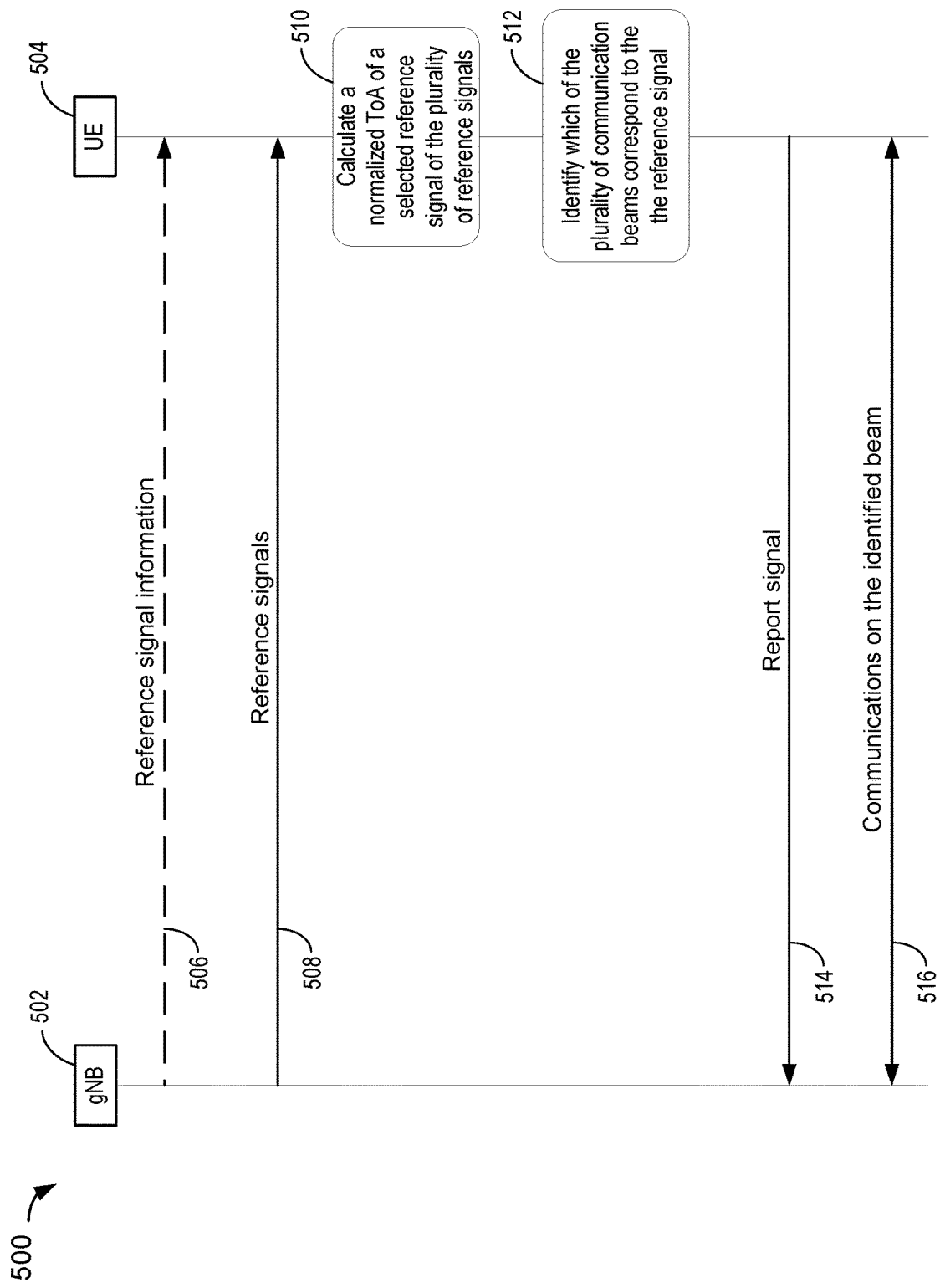
FIG. 5 is a simplified signal flow diagram of a wireless communication system, according to some embodiments.

FIG. 5 is a simplified signal flow diagram of a wireless communication system 500, according to some embodiments. The wireless communication system 500 includes a gNB 502 and a UE 504. As used herein with reference to FIGS. 5 and 6, the term "transmission" refers to the wireless communication of one or more signals between a gNB 502, 604 and a UE 504, 602 across one or more beams.

The gNB 502 optionally sends an RS information transmission 506 to the UE 504. The RS information transmission 506 may include reference signal information. The reference signal information may include some (including one or more information items) or all of the following information items, according to various embodiments of the disclosure. For example, this reference signal information may identify or define RS(s) that may be sent from the gNB 502 to the UE 504, and correlate the RS(s) with the one or more beams to enable the UE 504 to identify the beams during an RS transmission 508. The reference signal information may include information identifying one or more indexes associated with RSs that will be transmitted by the gNB 502. The reference signal information may include information such as a bitmap or pattern identifying to the UE 504 which RSs/beams received at the UE 504 should be considered for normalized timing information reporting by the UE 504. The reference signal information may include timing information of RSs that have been or will be transmitted to the UE 504 to enable the UE 504 to identify points of reference in time for normalizing ToAs of the RSs. In various embodiments according to FIG. 5, the first transmission 506 may not be sent in cases where the UE 504 is already aware of the reference signal information that could otherwise be transferred by the first transmission 506 (e.g., where the UE 504 is already aware of the information described above).

The gNB 502 then sends an RS transmission 508 to the UE 504. This second transmission includes a plurality of reference signals to the UE 504, which are sent on a plurality of communication beams.

Once the RS transmission 508 arrives at the UE 504, the UE 504 calculates 510 a normalized ToA(s) of a selected RS that arrived in the second transmission 508. In some embodiments, the UE 504 calculating the normalized ToA(s) of a selected RS comprises calculating the normalized ToAs of a plurality (e.g., some or all) of the RSs. The calculation of the normalized ToA value may be according to embodiments discussed herein.

The UE 504 also identifies 512 which of the plurality of communication beams connecting gNB 502 and UE 504 corresponds to the selected RS or RSs. Those of ordinary skill in the art will recognize that the calculating 510 and the identifying 512 may occur in any order.

The UE 504 then proceeds to transmit a report transmission 514 to the gNB 502. The report transmission 514 is configured to indicate to the gNB 502 a normalized ToA of the selected RS. The report transmission 514 may also indicate identifying information regarding the communication beam upon which the selected RS arrived, such as the beam index corresponding to the selected RS or RSs, discussed relative to other embodiments herein. The information included in the report signal may allow the gNB 502 to determine which of the communication beams was identified 512 by the UE 504 (i.e., which of the communication beams corresponds to the selected reference signal or reference signals).

The gNB 502 may then select a communication beam for use in subsequent communications based on the information of the report signal. Communications between the UE 504 and the gNB 502 may be performed using the selected communication beam.

In some embodiments of the wireless communication system 500, the communication beams used during RS transmission 508 may be one or more Tx beams used by the gNB 502 for transmission. In such embodiments a selected Tx beam is used by the gNB 502 in transmitting 516 subsequent communications to the UE 504.

It will be apparent to one of ordinary skill in the art that that the UE 504 may also be using a plurality of Rx beams in order to receive the second transmission 508 on the plurality of Tx (communication) beams used by the gNB 502. In such embodiments, the gNB 502 may also select an Rx beam for use during the transmission flow 500. This Rx beam may be selected by the gNB 502 using embodiments discussed herein (e.g., Embodiments 1-4). The selected Rx beam may be selected from among a plurality of the Rx beams used by the UE 504 to receive the RS transmission 508 (e.g., the UE 504 would be capable of identifying which Rx beam received certain combinations of the RSs). In some embodiments, the Rx beam selected by the gNB 502 in this manner may be used in addition to the Tx beam that may have been selected by the gNB 502.

Figure 6:
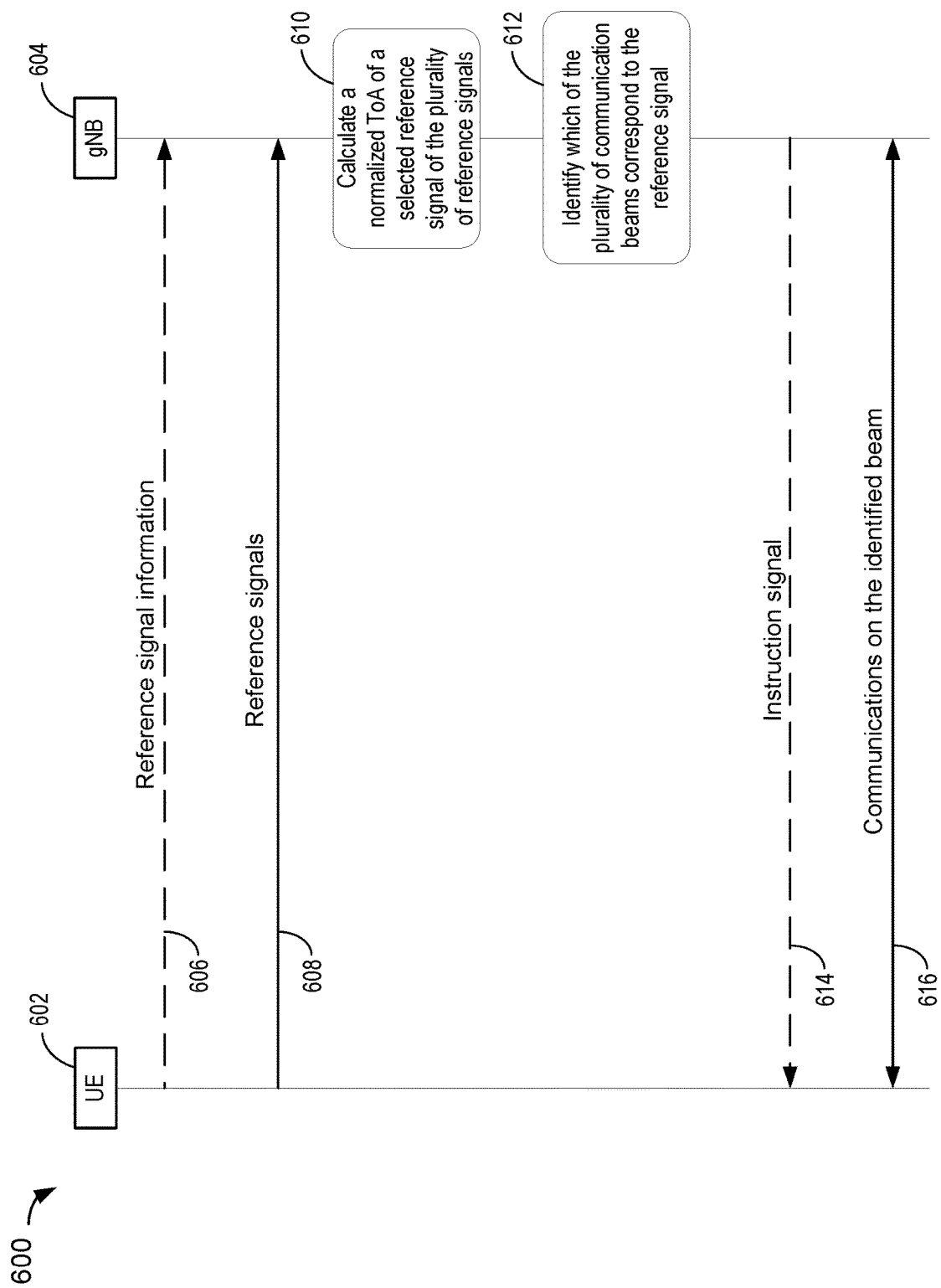
FIG. 6 is a simplified signal flow diagram of a wireless communication system, according to some embodiments.

FIG. 6 is a simplified signal flow diagram of a wireless communication system 600, according to some embodiments. The wireless communication system includes a UE 602 and a gNB 604. The UE 602 optionally sends an RS information transmission 606 to the UE 604. The first transmission 606 may include information similar to that of the RS information transmission 506 of FIG. 5. For example, the RS information transmission may include reference signal information. This reference signal information may identify or define RS(s) which may be sent from the UE 602 to the gNB 604. The reference signal information may include information identifying one or more indexes associated with RSs that will be transmitted by the UE 602. The reference signal information may include information such as a bitmap or pattern identifying to the gNB 604 which RSs/beams received at the gNB 604 should be considered by the gNB 604 for selection to calculate 610 normalized ToA. The reference signal information may include timing information corresponding to one or more transmitted RSs that have been or will be transmitted to the gNB 604 to enable the gNB 604 to enable the gNB 604 identify points of reference in time for normalizing ToAs of the RSs. In various embodiments according to FIG. 6, the RS information transmission 606 may not be sent in cases where the gNB 604 is already aware of the reference signal information that could otherwise be included in the first transmission 606 (e.g., where the gNB 604 is already aware of the information described above).

The UE 602 then sends an RS transmission 608 to the gNB 604. This RS transmission includes a plurality of reference signals on a plurality of communication beams.

Once the RS transmission 608 arrives at the gNB 604, the gNB 604 calculates 610 a normalized ToA of a selected RS or RSs that arrived in the RS transmission 508. The calculation of the normalized ToA value may be according to embodiments discussed herein.

The gNB 604 also identifies 612 which of the plurality of communication beams connecting UE 602 and gNB 604 corresponds to the selected RS or RSs. Persons with ordinary skill in the art will recognize that the calculating 610 and the identifying 612 may occur in any order.

The gNB 604 selects one of the communication beams based on the normalized ToAs of the RSs, and then optionally proceeds to send an instruction transmission 614 to the UE 602. The instruction transmission 614 is configured to instruct the UE 602 to use a specified communication beam for future communications.

Communications between the UE 602 and the gNB 604 may then be transmitted 616 on the communication beam that was selected by the gNB 604.

In some embodiments of the wireless communication system 600, the communication beams used during the RS transmission 608 may be one or more Tx beams used by the UE 602 for transmission. In such embodiments, the gNB 612 selects a Tx beam to be used by the UE 602 in transmissions 616 of subsequent communications.

It will be apparent to one of ordinary skill in the art that in some embodiments the gNB 604 may use a plurality of Rx beams in order to receive the RS transmission 608 on the plurality of Tx (communication) beams used by the UE 602. In such embodiments, the gNB 604 may also select an Rx beam for use in the transmissions 616. This Rx beam may be selected by the gNB 604 by using normalization and selection processes disclosed herein (e.g., Embodiments 1-4). In some embodiments, the Rx beam identified by the gNB 604 in this manner may be used in addition to the Tx beam that may have been identified 612 in the transmission flow 600 in the transmissions 616.

Figure 7:
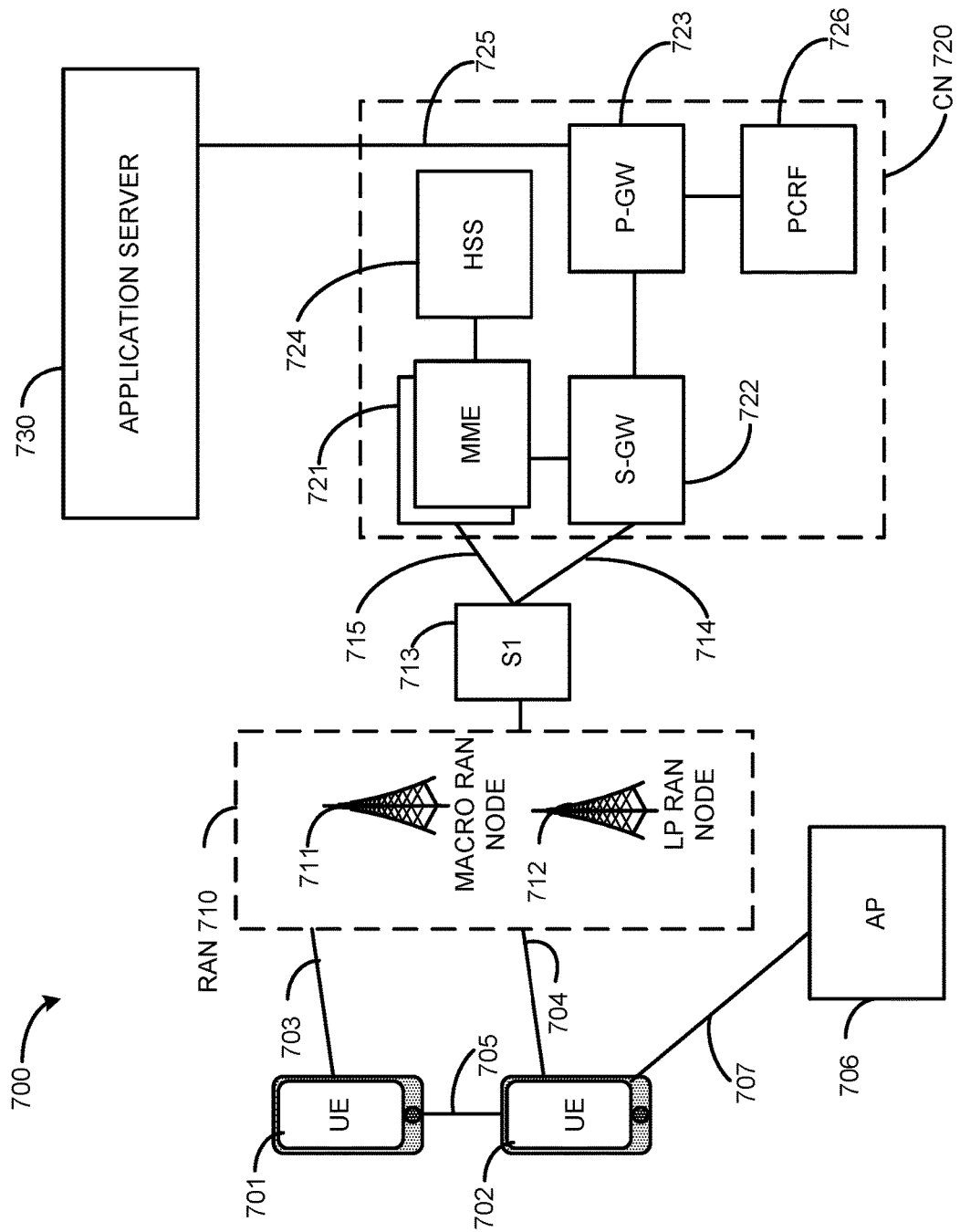
FIG. 7 illustrates an architecture of a system of a network in accordance with some embodiments.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710. The RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.11 protocol, wherein the AP 706 would comprise a wireless fidelity (WiFi®) router. In this example, the AP 706 may be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 702 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and a serving gateway (S-GW) 722, and an S1-mobility management entity (MME) interface 715, which is a signaling interface between the RAN nodes 711 and 712 and MMEs 721.

In this embodiment, the CN 720 comprises the MMEs 721, the S-GW 722, a Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the CN 720 (e.g., an EPC network) and external networks such as a network including the application server 730 (alternatively referred to as application function (AF)) via an Internet Protocol (IP) interface 725. Generally, an application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. A Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
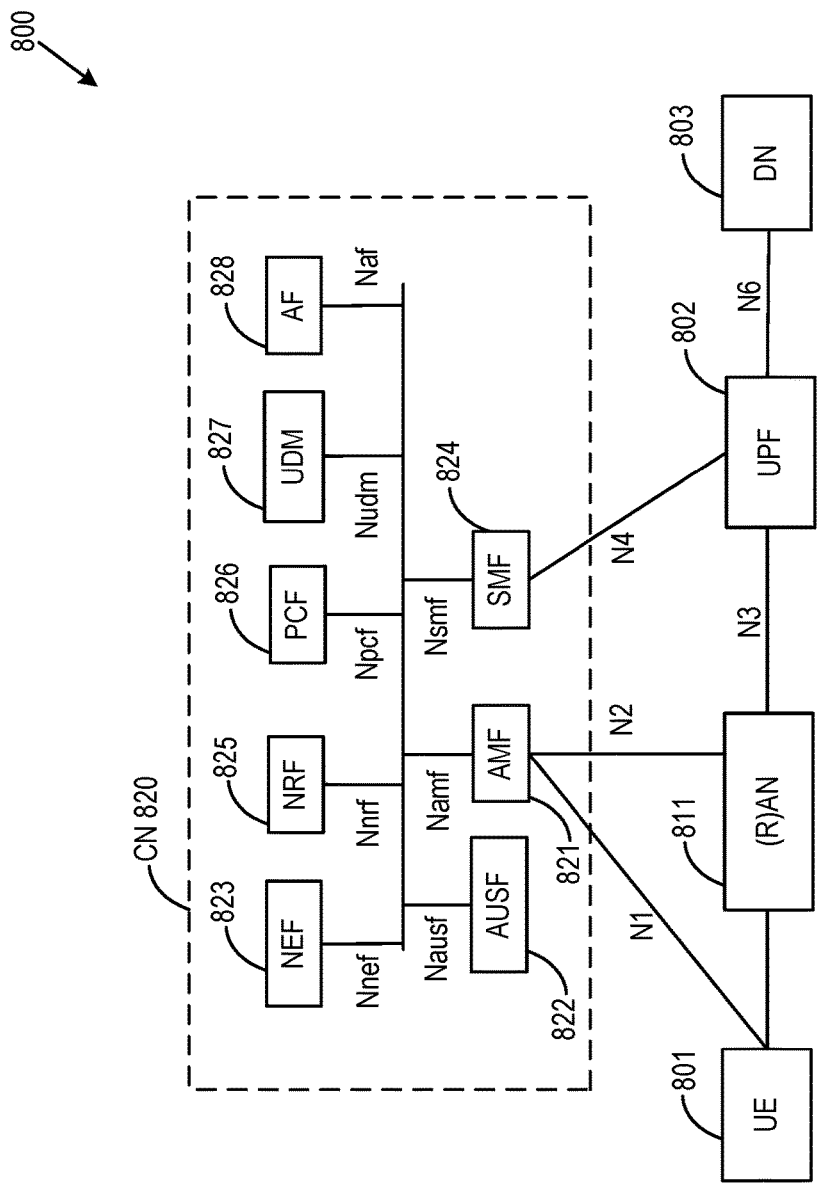
FIG. 8 illustrates an architecture of a system of a network in accordance with some embodiments.

FIG. 8 illustrates an architecture of a system 800 of a network in accordance with some embodiments. The system 800 is shown to include a UE 801, which may be the same or similar to UEs 701 and 702 discussed previously; a RAN node 811, which may be the same or similar to RAN nodes 711 and 712 discussed previously; a User Plane Function (UPF) 802; a Data network (DN) 803, which may be, for example, operator services, Internet access or 3rd party services; and a 5G Core Network (5GC or CN) 820.

The CN 820 may include an Authentication Server Function (AUSF) 822; a Core Access and Mobility Management Function (AMF) 821; a Session Management Function (SMF) 824; a Network Exposure Function (NEF) 823; a Policy Control Function (PCF) 826; a Network Function (NF) Repository Function (NRF) 825; a Unified Data Management (UDM) 827; and an Application Function (AF) 828. The CN 820 may also include other elements that are not shown, such as a Structured Data Storage network function (SDSF), an Unstructured Data Storage network function (UDSF), and the like.

The UPF 802 may act as an anchor point for intra-RAT and inter-RAT mobility, an external PDU session point of interconnect to DN 803, and a branching point to support multi-homed PDU session. The UPF 802 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 802 may include an uplink classifier to support routing traffic flows to a data network. The DN 803 may represent various network operator services, Internet access, or third party services. NY 803 may include, or be similar to application server 730 discussed previously.

The AUSF 822 may store data for authentication of UE 801 and handle authentication related functionality. The AUSF 822 may facilitate a common authentication framework for various access types.

The AMF 821 may be responsible for registration management (e.g., for registering UE 801, etc.), connection management, reachability management, mobility management, and lawful interception of AMF-related events, and access authentication and authorization. AMF 821 may provide transport for SM messages between and SMF 824, and act as a transparent proxy for routing SM messages. AMF 821 may also provide transport for short message service (SMS) messages between UE 801 and an SMS function (SMSF) (not shown by FIG. 8). AMF 821 may act as Security Anchor Function (SEA), which may include interaction with the AUSF 822 and the UE 801, receipt of an intermediate key that was established as a result of the UE 801 authentication process. Where USIM based authentication is used, the AMF 821 may retrieve the security material from the AUSF 822. AMF 821 may also include a Security Context Management (SCM) function, which receives a key from the SEA that it uses to derive access-network specific keys. Furthermore, AMF 821 may be a termination point of RAN CP interface (N2 reference point), a termination point of NAS (NI) signaling, and perform NAS ciphering and integrity protection.

AMF 821 may also support NAS signaling with a UE 801 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 801 and AMF 821, and relay uplink and downlink user-plane packets between the UE 801 and UPF 802. The N3IWF also provides mechanisms for IPsec tunnel establishment with the UE 801.

The SMF 824 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 824 may include the following roaming functionality: handle local enforcement to apply QoS SLAs (VPLMN); charging data collection and charging interface (VPLMN); lawful intercept (in VPLMN for SM events and interface to LI System); support for interaction with external DN for transport of signaling for PDU session authorization/authentication by external DN.

The NEF 823 may provide means for securely exposing the services and capabilities provided by 3GPP network functions for third party, internal exposure/re-exposure, Application Functions (e.g., AF 828), edge computing or fog computing systems, etc. In such embodiments, the NEF 823 may authenticate, authorize, and/or throttle the AFs. NEF 823 may also translate information exchanged with the AF 828 and information exchanged with internal network functions. For example, the NEF 823 may translate between an AF-Service-Identifier and an internal 5GC information. NEF 823 may also receive information from other network functions (NFs) based on exposed capabilities of other network functions. This information may be stored at the NEF 823 as structured data, or at a data storage NF using a standardized interfaces. The stored information can then be re-exposed by the NEF 823 to other NFs and AFs, and/or used for other purposes such as analytics.

The NRF 825 may support service discovery functions, receive NF Discovery Requests from NF instances, and provide the information of the discovered NF instances to the NF instances. NRF 825 also maintains information of available NF instances and their supported services.

The PCF 826 may provide policy rules to control plane function(s) to enforce them, and may also support unified policy framework to govern network behavior. The PCF 826 may also implement a front end (FE) to access subscription information relevant for policy decisions in a UDR of UDM 827.

The UDM 827 may handle subscription-related information to support the network entities' handling of communication sessions, and may store subscription data of UE 801. The UDM 827 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 826. UDM 827 may also support SMS management, wherein an SMS-FE implements the similar application logic as discussed previously.

The AF 828 may provide application influence on traffic routing, access to the Network Capability Exposure (NCE), and interact with the policy framework for policy control. The NCE may be a mechanism that allows the 5GC and AF 828 to provide information to each other via NEF 823, which may be used for edge computing implementations. In such implementations, the network operator and third party services may be hosted close to the UE 801 access point of attachment to achieve an efficient service delivery through the reduced end-to-end latency and load on the transport network. For edge computing implementations, the 5GC may select a UPF 802 close to the UE 801 and execute traffic steering from the UPF 802 to DN 803 via the N6 interface. This may be based on the UE subscription data, UE location, and information provided by the AF 828. In this way, the AF 828 may influence UPF (re)selection and traffic routing. Based on operator deployment, when AF 828 is considered to be a trusted entity, the network operator may permit AF 828 to interact directly with relevant NFs.

As discussed previously, the CN 820 may include an SMSF, which may be responsible for SMS subscription checking and verification, and relaying SM messages to/from the UE 801 to/from other entities, such as an SMS-GMSC/IWMSC/SMS-router. The SMS may also interact with AMF 821 and UDM 827 for notification procedure that the UE 801 is available for SMS transfer (e.g., set a UE not reachable flag, and notifying UDM 827 when UE 801 is available for SMS).

The system 800 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 800 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network.

There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 820 may include an Nx interface, which is an inter-CN interface between the MME (e.g., MME 721) and the AMF 821 in order to enable interworking between CN 820 and CN 720.

Although not shown by FIG. 8, system 800 may include multiple RAN nodes 811 wherein an Xn interface is defined between two or more RAN nodes 811 (e.g., gNBs and the like) that connecting to 5GC 820, between a RAN node 811 (e.g., gNB) connecting to 5GC 820 and an eNB (e.g., a RAN node 711 of FIG. 7), and/or between two eNBs connecting to 5GC 820.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 801 in a connected mode (e.g., CM-CONNECTED) including functionality to manage the UE mobility for connected mode between one or more RAN nodes 811. The mobility support may include context transfer from an old (source) serving RAN node 811 to new (target) serving RAN node 811; and control of user plane tunnels between old (source) serving RAN node 811 to new (target) serving RAN node 811.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 9:
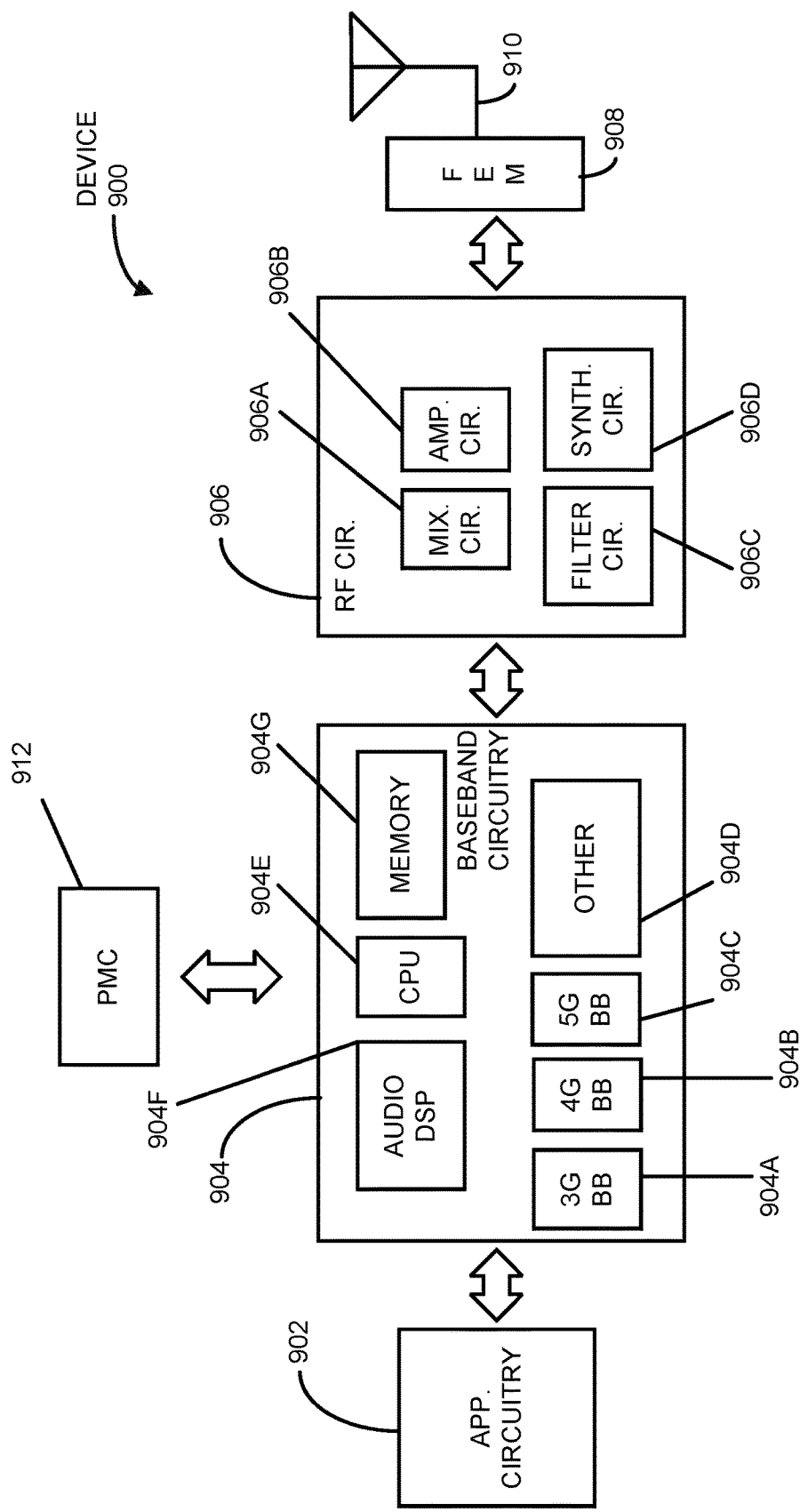
FIG. 9 illustrates example components of a device in accordance with some embodiments.

FIG. 9 illustrates example components of a device 900 in accordance with some embodiments. In some embodiments, the device 900 may include application circuitry 902, baseband circuitry 904, Radio Frequency (RF) circuitry 906, front-end module (FEM) circuitry 908, one or more antennas 910, and power management circuitry (PMC) 912 coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), sixth generation (6G), etc.). The baseband circuitry 904 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include one or more audio digital signal processor(s) (DSP) 904F. The audio DSP(s) 904F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. The RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the receive signal path of the RF circuitry 906 may include mixer circuitry 906A, amplifier circuitry 906B and filter circuitry 906C. In some embodiments, the transmit signal path of the RF circuitry 906 may include filter circuitry 906C and mixer circuitry 906A. RF circuitry 906 may also include synthesizer circuitry 906D for synthesizing a frequency for use by the mixer circuitry 906A of the receive signal path and the transmit signal path. In some embodiments, the mixer circuitry 906A of the receive signal path may be configured to down-convert RF signals received from the FEM circuitry 908 based on the synthesized frequency provided by synthesizer circuitry 906D. The amplifier circuitry 906B may be configured to amplify the down-converted signals and the filter circuitry 906C may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 906A of the receive signal path may comprise passive mixers, although the scope of the embodiments is not limited in this respect.

In some embodiments, the mixer circuitry 906A of the transmit signal path may be configured to up-convert input baseband signals based on the synthesized frequency provided by the synthesizer circuitry 906D to generate RF output signals for the FEM circuitry 908. The baseband signals may be provided by the baseband circuitry 904 and may be filtered by the filter circuitry 906C.

In some embodiments, the mixer circuitry 906A of the receive signal path and the mixer circuitry 906A of the transmit signal path may include two or more mixers and may be arranged for quadrature downconversion and upconversion, respectively. In some embodiments, the mixer circuitry 906A of the receive signal path and the mixer circuitry 906A of the transmit signal path may include two or more mixers and may be arranged for image rejection (e.g., Hartley image rejection). In some embodiments, the mixer circuitry 906A of the receive signal path and the mixer circuitry 906A may be arranged for direct downconversion and direct upconversion, respectively. In some embodiments, the mixer circuitry 906A of the receive signal path and the mixer circuitry 906A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906D may be a fractional-N synthesizer or a fractional N/N+1 synthesizer, although the scope of the embodiments is not limited in this respect as other types of frequency synthesizers may be suitable. For example, synthesizer circuitry 906D may be a delta-sigma synthesizer, a frequency multiplier, or a synthesizer comprising a phase-locked loop with a frequency divider.

The synthesizer circuitry 906D may be configured to synthesize an output frequency for use by the mixer circuitry 906A of the RF circuitry 906 based on a frequency input and a divider control input. In some embodiments, the synthesizer circuitry 906D may be a fractional N/N+1 synthesizer.

In some embodiments, frequency input may be provided by a voltage controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 906D of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 906D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. The FEM circuitry 908 may also include a transmit signal path which may include circuitry configured to amplify signals for transmission provided by the RF circuitry 906 for transmission by one or more of the one or more antennas 910. In various embodiments, the amplification through the transmit or receive signal paths may be done solely in the RF circuitry 906, solely in the FEM circuitry 908, or in both the RF circuitry 906 and the FEM circuitry 908.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by the RF circuitry 906), and one or more filters to generate RF signals for subsequent transmission (e.g., by one or more of the one or more antennas 910).

In some embodiments, the PMC 912 may manage power provided to the baseband circuitry 904. In particular, the PMC 912 may control power-source selection, voltage scaling, battery charging, or DC-to-DC conversion. The PMC 912 may often be included when the device 900 is capable of being powered by a battery, for example, when the device 900 is included in a UE. The PMC 912 may increase the power conversion efficiency while providing desirable implementation size and heat dissipation characteristics.

FIG. 9 shows the PMC 912 coupled only with the baseband circuitry 904. However, in other embodiments, the PMC 912 may be additionally or alternatively coupled with, and perform similar power management operations for, other components such as, but not limited to, the application circuitry 902, the RF circuitry 906, or the FEM circuitry 908.

In some embodiments, the PMC 912 may control, or otherwise be part of, various power saving mechanisms of the device 900. For example, if the device 900 is in an RRC_Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC_Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
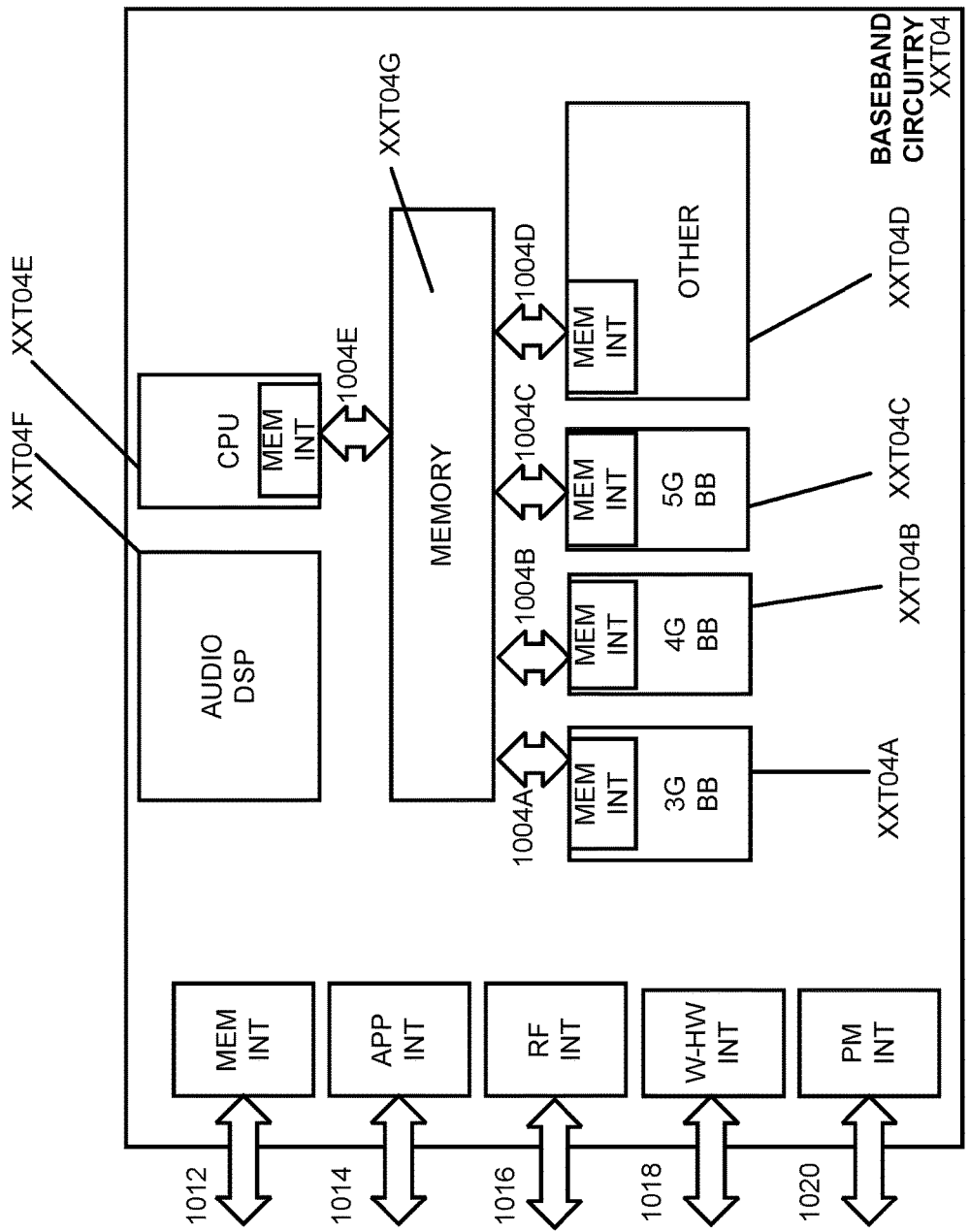
FIG. 10 illustrates example interfaces of baseband circuitry in accordance with some embodiments.

FIG. 10 illustrates example interfaces of baseband circuitry in accordance with some embodiments. As discussed above, the baseband circuitry 904 of FIG. 9 may comprise processors 904A-904E and a memory 904G utilized by said processors. Each of the processors 904A-904E may include a memory interface, 1004A-1004E, respectively, to send/receive data to/from the memory 904G.

The baseband circuitry 904 may further include one or more interfaces to communicatively couple to other circuitries/devices, such as a memory interface 1012 (e.g., an interface to send/receive data to/from memory external to the baseband circuitry 904), an application circuitry interface 1014 (e.g., an interface to send/receive data to/from the application circuitry 902 of FIG. 9), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from the PMC 912.

Figure 11:
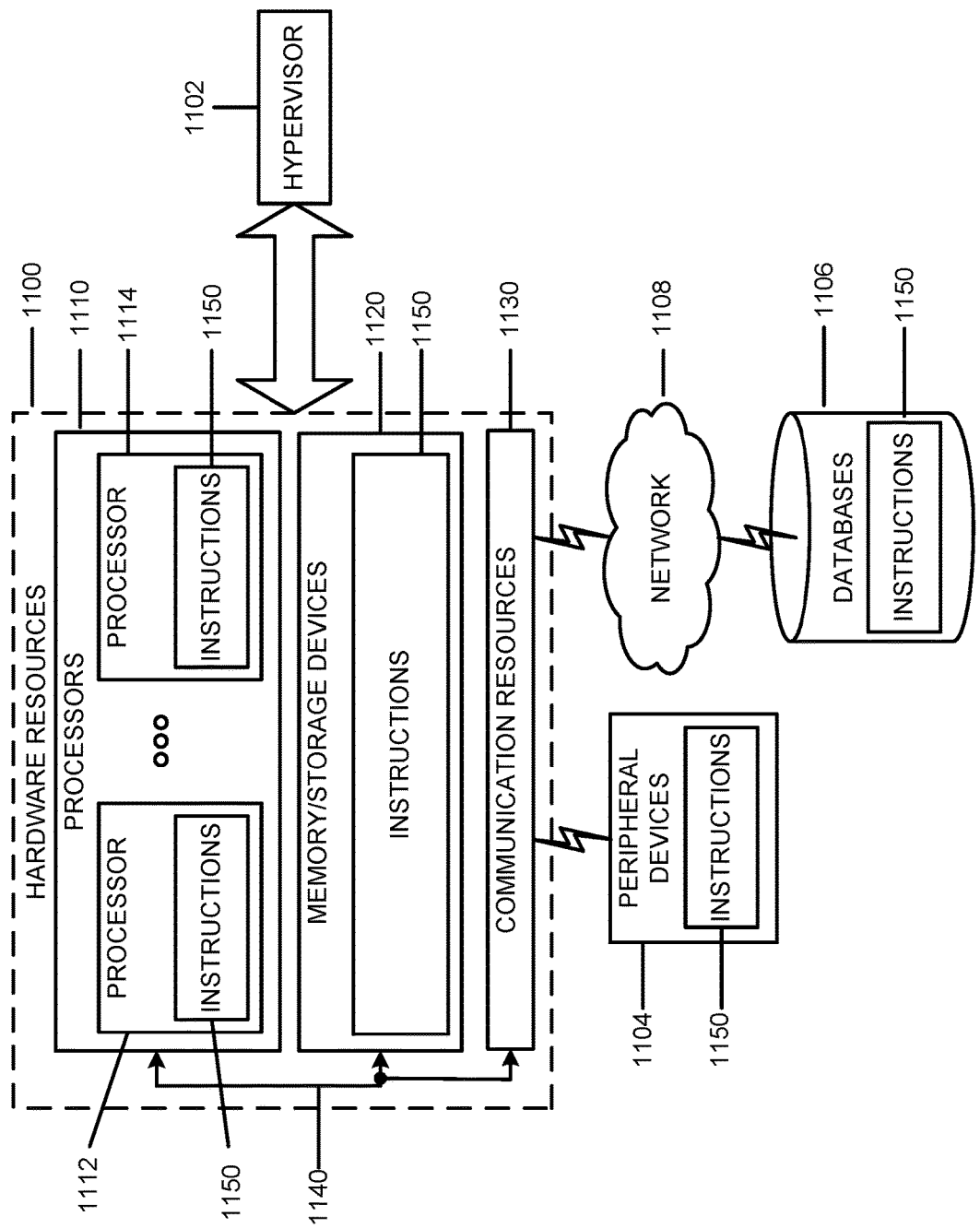
FIG. 11 is a block diagram illustrating components, according to some example embodiments, able to read instructions from a machine-readable or computer-readable medium (e.g., a non-transitory machine-readable storage medium) and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100.

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114.

The memory/storage devices 1120 may include main memory, disk storage, or any suitable combination thereof. The memory/storage devices 1120 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

EXAMPLES

The following is a non-exhaustive list of example embodiments that fall within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below, and the above disclosed embodiments, are not combinable, it is contemplated within the scope of the disclosure that such examples and embodiments are combinable.

Example 1 may include if RS for positioning are transmitted or received via multiple Tx or Rx beams, the ToA of the earliest arrived RS may be used for positioning timing regardless of the used Tx or Rx beam
  The beams may include Tx beam at gNB for downlink, or, Rx beam at UE for downlink, or Tx beam at UE for uplink, or Rx beam at gNB for uplink.
  The RS for positioning may include but not limit to:
    SSB(synchronization sequence block), or
    PRS(positioning reference signal), or
    CSI-RS, or
    DMRS for PBCH, or
    PSS and/or SSS, or
    PRACH, or
    PUCCH, or
    SRS (sounding reference signal)
  The ToA may be estimated from the first arrival path of a specific RS
  The ToAs of RS with different beams may be normalized to a same time period unit for comparison, the time period unit may include but not limit to:
    Time slot, or
    OFDM symbol, or
    Subframe, or
    System frame
  UE may report the timing information associated with specific beam/RS index Example 2 may include if RS for positioning are transmitted or received via multiple Tx or Rx beams, network may indicate UE to estimate RS timing for top/best n beams (e.g. top n strongest RS with corresponding beams, n is an integer), UE may estimate RS timings on these n beams, and UE may report the timing information associated with specific beam/RS index, or UE may report the timing information for the earliest ToA among these RS/beams.

The beams may include Tx beam at gNB for downlink, or, Rx beam at UE for downlink, or Tx beam at UE for uplink, or Rx beam at gNB for uplink.
    The RS for positioning may include but not limit to:
        SSB(synchronization sequence block), or
        PRS(positioning reference signal), or
        CSI-RS, or
        DMRS for PBCH, or
        PSS and/or SSS, or
        PRACH, or
        PUCCH, or
        SRS (sounding reference signal)
    The RS timing may be Tx timing or Rx timing, and Rx timing may be estimated from the first arrival path of a specific RS
    The ToAs of RS with different beams may be normalized to a same time period unit for comparison, the time period unit may include but not limit to:
        Time slot, or
        OFDM symbol, or
        Subframe, or
        System frame Example 3 may include if RS for positioning are transmitted or received via multiple Tx or Rx beams, network may indicate UE to estimate timing of RS whose RSRP/RSRQ/SINR are above a threshold, UE may estimate RS timings on these n beams, and UE may report the timing information associated with specific beam/RS index, or UE may report the timing information for the earliest ToA among these RS/beams.

The beams may include Tx beam at gNB for downlink, or, Rx beam at UE for downlink, or Tx beam at UE for uplink, or Rx beam at gNB for uplink.
    The RS for positioning may include but not limit to:
        SSB(synchronization sequence block), or
        PRS(positioning reference signal), or
        CSI-RS, or
        DMRS for PBCH, or
        PSS and/or SSS, or
        PRACH, or
        PUCCH, or
        SRS (sounding reference signal)
    The RS timing may be Tx timing or Rx timing, and Rx timing may be estimated from the first arrival path of a specific RS
    The ToAs of RS with different beams may be normalized to a same time period unit for comparison, the time period unit may include but not limit to:
        Time slot, or
        OFDM symbol, or
        Subframe, or
        System frame Example 4 may include if RS for positioning are transmitted or received via multiple Tx or Rx beams, network may indicate a bitmap of RS/beam or index of RS/beam or pattern of RS/beam or RS/beam to UE to require UE measure the ToA on those RS/beam which are included in the bitmap/index/pattern, UE may estimate RS timings on these n beams, and UE may report the timing information associated with specific beam/RS index, or UE may report the timing information for the earliest ToA among these RS/beams.

The beams may include Tx beam at gNB for downlink, or, Rx beam at UE for downlink, or Tx beam at UE for uplink, or Rx beam at gNB for uplink.
    The RS for positioning may include but not limit to:
        SSB(synchronization sequence block), or
        PRS(positioning reference signal), or
        CSI-RS, or
        DMRS for PBCH, or
        PSS and/or SSS, or
        PRACH, or
        PUCCH, or
        SRS (sounding reference signal)
    The RS timing may be Tx timing or Rx timing, and Rx timing may be estimated from the first arrival path of a specific RS
    The ToAs of RS with different beams may be normalized to a same time period unit for comparison, the time period unit may include but not limit to:
        Time slot, or
        OFDM symbol, or
        Subframe, or
        System frame Example 5: An apparatus of a first cellular communication device, comprising: a data storage device configured to store reference signal data identifying a plurality of reference signals corresponding to a plurality of communication beams used by a second cellular communication device; and one or more processors configured to: process a received portion of the plurality of reference signals received from the second cellular communication device through at least a portion of the plurality of communication beams; normalize times of arrival (ToAs) of one or more reference signals of the received portion of the plurality of reference signals to a time period unit; and identify which of the plurality of communication beams correspond to the one or more reference signals using the reference signal data.

Example 6: The apparatus of Example 5, wherein the one or more processors are further configured to generate a report signal to be transmitted to the second cellular communication device, the report signal configured to indicate a normalized ToA of at least one of the one or more reference signals.

Example 7: The apparatus of Example 6, wherein a report signal indicates only the normalized ToA of the one or more reference signals of the received portion of the plurality of reference signals that has a earliest normalized ToA.

Example 8: The apparatus of Example 5, wherein the one or more reference signals include each reference signal of the received portion of the plurality of reference signals.

Example 9: The apparatus of Example 5, wherein the one or more reference signals include a subset of the received portion of the plurality of reference signals, the subset determined based on a signal quality of each reference signal of the received portion of the plurality of reference signals.

Example 10: The apparatus of Example 9, wherein the one or more processors are further configured to generate a report signal to be transmitted to the second cellular communication device, the report signal configured to indicate only a normalized ToA of a reference signal in the subset with an earliest normalized ToA.

Example 11: The apparatus of Example 9, wherein the one or more processors are further configured to generate a report signal to be transmitted to the second cellular communication device, the report signal configured to indicate only a normalized ToA of a reference signal in the subset with the strongest signal quality.

Example 12: The apparatus of Example 9, wherein the one or more processors are further configured to generate a report signal to be transmitted to the second cellular communication device, the report signal configured to indicate a normalized ToA of each reference signal in the subset.

Example 13: The apparatus of Example 9, wherein the subset includes a pre-determined number of the reference signals of the received portion of the plurality of reference signals with a highest signal quality.

Example 14: The apparatus of Example 9, wherein the subset includes any reference signals of the received portion of the plurality of reference signals with a signal quality above a pre-determined threshold.

Example 15: The apparatus of Example 9, wherein the signal quality of each of the plurality of reference signals in the received portion of the plurality of reference signals is determined using one or more measurements selected from the group consisting of Reference Signal Receive Power (RSRP), Reference Signal Receive Quality (RSRQ), and Signal to Interference and Noise Ratio (SINR).

Example 16: The apparatus of Example 5, wherein the data storage device is further configured to store a bitmap received from the second cellular communication device, the bitmap configured to indicate a subset of the plurality of reference signals that are allowed to be included in the one or more reference signals.

Example 17: The apparatus of Example 16, wherein the bitmap is configured to indicate the reference signals themselves, the communication beams corresponding to the reference signals, indexes of the reference signals or communication beams, patterns of the reference signals or beams, or combinations thereof corresponding to the subset of the plurality of reference signals.

Example 18: The apparatus of Example 5, wherein the one or more processors are configured to generate other reference signals to be sent to the second cellular communication device to enable the second cellular communication device to determine normalized ToAs of the other reference signals.

Example 19: The apparatus of Example 5, wherein the plurality of reference signals comprise Synchronization Signal Blocks (SSBs), Positioning Reference Signals (PRSs), Channel State Information Reference Signals (CSI-RSs), DeModulation Reference Signals for one or more Physical Broadcast Channels (DMRSs for PBCH), Primary Synchronization Signals (PSSs), Secondary Synchronization Signals (SSSs), Physical Random Access Channel (PRACH) signals, Physical Uplink Control Channel (PUCCH) signals, Sounding Reference Signals (SRSs), or combinations thereof.

Example 20: The apparatus of Example 5, wherein the time period unit comprises a time slot, an Orthogonal Frequency Division Multiplexing (ODFM) symbol, a subframe, or a system frame.

Example 21: An apparatus of a User Equipment (UE), comprising: a data storage device configured to store reference signal data identifying a plurality of reference signals corresponding to a plurality of communication beams used by a cellular base station; and one or more processors configured to: process a received portion of the plurality of reference signals received from the cellular base station through at least a portion of the plurality of communication beams; normalize times of arrival (ToAs) of one or more reference signals of the received portion of the plurality of reference signals to a time period unit; identify which of the plurality of communication beams correspond to the one or more reference signals using the reference signal data; and generate a report signal to be transmitted to the cellular base station, the report signal configured to indicate an earliest normalized ToA of an earliest reference signal of the one or more reference signals.

Example 22: The apparatus of Example 21, wherein the report signal further includes a reference signal index identifying the earliest reference signal.

Example 23: An apparatus of a cellular base station, comprising: a data storage device configured to store reference signal data identifying a plurality of reference signals corresponding to a plurality of communication beams used by an apparatus of a User Equipment (UE); and one or more processors configured to: process a received portion of the plurality of reference signals received from the UE through at least a portion of the plurality of communication beams; normalize times of arrival (ToAs) of one or more reference signals of the received portion of the plurality of reference signals to a time period unit; identify which of the plurality of communication beams correspond to the one or more reference signals using the reference signal data; determine an earliest normalized ToA of an earliest reference signal of the one or more reference signals; and select a communication beam of the portion of the plurality of communication beams for subsequent communication, the selected communication beam corresponding to the earliest normalized ToA.

Example 24: The apparatus of Example 23, wherein the one or more processors are further configured to generate an instruction signal to be transmitted to the UE, the instruction signal configured to instruct the UE to use the selected communication beam.

Example 25: The apparatus of Example 23, wherein the plurality of reference signals received from the UE comprise at least one Sounding Reference Signal (SRS).

Example 26: An apparatus of a User Equipment (UE), comprising: a data storage device configured to: store reference signal data identifying a plurality of reference signals corresponding to a plurality of communication beams used by a cellular base station; and one or more processors configured to: process an indication received from the cellular base station, the indication indicating one or more reference signals of interest; process a received portion of the plurality of reference signals received from the cellular base station through at least a portion of the plurality of communication beams; identify a subset of the reference signals of the received portion of the plurality of reference signals that correspond to the one or more reference signals of interest; normalize times of arrival (ToAs) of the subset of the received reference signals of interest; and generate a report signal to be transmitted to the cellular base station, the report signal configured to indicate at least one normalized ToA corresponding to at least one of the received reference signals of interest.

Example 27: The apparatus of Example 26, wherein the report signal is configured to indicate a normalized ToA and a corresponding communication beam of the received reference signal of interest with an earliest normalized ToA.

Example 28: An apparatus of a cellular base station, comprising: a data storage device configured to: store reference signal data identifying a plurality of reference signals corresponding to a plurality of communication beams received from a User Equipment (UE); and store information indicating reference signals of interest; and one or more processors configured to: process a received portion of the plurality of reference signals received from the UE through at least a portion of the plurality of communication beams;

identify a subset of the reference signals of the received portion of the plurality of reference signals that correspond to the one or more reference signals of interest; normalize times of arrival (ToAs) of the reference signals in the subset; and identify which of the plurality of communication beams correspond to the reference signals in the subset.

Example 29: The apparatus of Example 28, wherein the one or more processors are further configured to generate an instruction signal to be transmitted to the UE, the instruction signal configured to instruct the UE to use a specified communication beam.

Example 30: The apparatus of Example 28, wherein the reference signals of interest comprise Sounding Reference Signals (SRSs).

Example 31 may include an apparatus comprising means to perform one or more elements of a method described in or related to any of Examples 1-30, or any other method or process described herein.

Example 32 may include one or more non-transitory computer-readable media comprising instructions to cause an electronic device, upon execution of the instructions by one or more processors of the electronic device, to perform one or more elements of a method described in or related to any of Examples 1-30, or any other method or process described herein.

Example 33 may include an apparatus comprising logic, modules, or circuitry to perform one or more elements of a method described in or related to any of Examples 1-30, or any other method or process described herein.

Example 34 may include a method, technique, or process as described in or related to any of Examples 1-30, or portions or parts thereof.

Example 35 may include an apparatus comprising: one or more processors and one or more computer readable media comprising instructions that, when executed by the one or more processors, cause the one or more processors to perform the method, techniques, or process as described in or related to any of Examples 1-30, or portions thereof.

Example 36 may include a signal as described in or related to any of Examples 1-30, or portions or parts thereof.

Example 37 may include a signal in a wireless network as shown and described herein.

Example 38 may include a method of communicating in a wireless network as shown and described herein.

Example 39 may include a system for providing wireless communication as shown and described herein.

Example 40 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It will be apparent to those having skill in the art that many changes may be made to the details of the above-described embodiments without departing from the underlying principles of the disclosure. The scope of the present disclosure should, therefore, be determined only by the following claims.

The invention claimed is:

1. An apparatus of a first cellular communication device, comprising:
   a data storage device configured to store reference signal data identifying a plurality of reference signals corresponding to a plurality of communication beams used by a second cellular communication device; and
   one or more processors configured to:
      process a received portion of the plurality of reference signals received from the second cellular communication device through at least a portion of the plurality of communication beams;
      normalize times of arrival (ToAs) of one or more reference signals of the received portion of the plurality of reference signals to a common time period unit for comparison;
      identify which of the plurality of communication beams correspond to the one or more reference signals using the reference signal data; and
      generate a report signal to be transmitted to the second cellular communication device, the report signal configured to indicate the normalized ToAs of the one or more reference signals, wherein the report signal indicates only the normalized ToAs of the one or more reference signals of the received portion of the plurality of reference signals that has an earliest normalized ToA.

2. The apparatus of claim 1, wherein the one or more reference signals include each reference signal of the received portion of the plurality of reference signals.

3. The apparatus of claim 1, wherein the one or more reference signals include a subset of the received portion of the plurality of reference signals, the subset determined based on a signal quality of each reference signal of the received portion of the plurality of reference signals.

4. The apparatus of claim 3, wherein the one or more processors are further configured to generate a report signal to be transmitted to the second cellular communication device, the report signal configured to indicate only a normalized ToA of a reference signal in the subset with an earliest normalized ToA.

5. The apparatus of claim 3, wherein the one or more processors are further configured to generate a report signal to be transmitted to the second cellular communication device, the report signal configured to indicate only a normalized ToA of a reference signal in the subset with a strongest signal quality.

6. The apparatus of claim 3, wherein the one or more processors are further configured to generate a report signal to be transmitted to the second cellular communication device, the report signal configured to indicate a normalized ToA of each reference signal in the subset.

7. The apparatus of claim 3, wherein the subset includes a pre-determined number of the reference signals of the received portion of the plurality of reference signals with a highest signal quality.

8. The apparatus of claim 3, wherein the subset includes any reference signals of the received portion of the plurality of reference signals with a signal quality above a pre-determined threshold.

9. The apparatus of claim 3, wherein the signal quality of each of the plurality of reference signals in the received portion of the plurality of reference signals is determined using one or more measurements selected from a group consisting of Reference Signal Receive Power (RSRP), Reference Signal Receive Quality (RSRQ), and Signal to Interference and Noise Ratio (SINR).

10. The apparatus of claim 1, wherein the data storage device is further configured to store a bitmap received from the second cellular communication device, the bitmap configured to indicate a subset of the plurality of reference signals that are allowed to be included in the one or more reference signals.

11. The apparatus of claim 10, wherein the bitmap is configured to indicate the reference signals themselves, the communication beams corresponding to the reference signals, indexes of the reference signals or communication beams, patterns of the reference signals or the communication beams, or combinations thereof corresponding to the subset of the plurality of reference signals.

12. The apparatus of claim 1, wherein the one or more processors are configured to generate other reference signals to be sent to the second cellular communication device to enable the second cellular communication device to determine normalized ToAs of the other reference signals.

13. The apparatus of claim 1, wherein the plurality of reference signals comprise Synchronization Signal Blocks (SSBs), Positioning Reference Signals (PRSs), Channel State Information Reference Signals (CSI-RSs), DeModulation Reference Signals for one or more Physical Broadcast Channels (DMRSs for PBCH), Primary Synchronization Signals (PSSs), Secondary Synchronization Signals (SSSs), Physical Random Access Channel (PRACH) signals, Physical Uplink Control Channel (PUCCH) signals, Sounding Reference Signals (SRSs), or combinations thereof.

14. The apparatus of claim 1, wherein the common time period unit comprises a time slot, an Orthogonal Frequency Division Multiplexing (ODFM) symbol, a subframe, or a system frame.

15. A method to be performed by a first cellular communication device, the method comprising:
processing a received portion of a plurality of reference signals received from a second cellular communication device through at least a portion of a plurality of communication beams;
normalizing times of arrival (ToAs) of one or more reference signals of the received portion of the plurality of reference signals to a common time period unit for comparison;
identifying which of the plurality of communication beams correspond to the one or more reference signals; and
generating a report signal to be transmitted to the second cellular communication device, the report signal configured to indicate the normalized ToAs of the one or more reference signals, wherein the report signal indicates only the normalized ToAs of the one or more reference signals of the received portion of the plurality of reference signals that has an earliest normalized ToA.

16. The method of claim 15, wherein the one or more reference signals include each reference signal of the received portion of the plurality of reference signals.

17. The method of claim 15, wherein the one or more reference signals include a subset of the received portion of the plurality of reference signals, the subset determined based on a signal quality of each reference signal of the received portion of the plurality of reference signals.

18. A non-transitory computer-readable medium comprising instructions to cause an electronic device, upon execution of the instructions by one or more processors of the electronic device, to:
process a received portion of a plurality of reference signals received from a second cellular communication device through at least a portion of a plurality of communication beams;
normalize times of arrival (ToAs) of one or more reference signals of the received portion of the plurality of reference signals to a common time period unit for comparison;
identify which of the plurality of communication beams correspond to the one or more reference signals; and
generate a report signal to be transmitted to the second cellular communication device, the report signal configured to indicate the normalized ToAs of the one or more reference signals, wherein the report signal indicates only the normalized ToAs of the one or more reference signals of the received portion of the plurality of reference signals that has an earliest normalized ToA.

19. The non-transitory computer-readable medium of claim 18, wherein the one or more reference signals include each reference signal of the received portion of the plurality of reference signals.

20. The non-transitory computer-readable medium of claim 18, wherein the one or more reference signals include a subset of the received portion of the plurality of reference signals, the subset determined based on a signal quality of each reference signal of the received portion of the plurality of reference signals.

* * * * *